US010976683B2

(12) United States Patent
Ishida et al.

(10) Patent No.: US 10,976,683 B2
(45) Date of Patent: Apr. 13, 2021

(54) ELECTROPHOTOGRAPHIC MEMBER, ELECTROPHOTOGRAPHIC PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Kazutoshi Ishida, Mishima (JP); Yuji Sakurai, Susono (JP); Minoru Nakamura, Mishima (JP); Ryo Sugiyama, Mishima (JP); Toru Ishii, Mishima (JP); Kenta Matsunaga, Susono (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 16/516,790

(22) Filed: Jul. 19, 2019

(65) Prior Publication Data

US 2020/0041926 A1 Feb. 6, 2020

(30) Foreign Application Priority Data

Jul. 31, 2018 (JP) .............................. JP2018-144362

(51) Int. Cl.
*G03G 15/08* (2006.01)
*G03G 15/16* (2006.01)
(Continued)

(52) U.S. Cl.
CPC .......... *G03G 15/0808* (2013.01); *C08L 33/08* (2013.01); *C08L 33/10* (2013.01);
(Continued)

(58) Field of Classification Search
CPC .......... G03G 15/0808; G03G 15/1685; G03G 2215/00683; G03G 15/162;
(Continued)

(56) References Cited

U.S. PATENT DOCUMENTS 5,470,652 A 11/1995 Miura et al.
6,725,002 B2 4/2004 Sakurai et al.
(Continued)

FOREIGN PATENT DOCUMENTS

EP 2 869 130 5/2015
EP 3 062 162 8/2016
(Continued)

OTHER PUBLICATIONS

U.S. Appl. No. 16/384,043, filed Apr. 15, 2019, Ryo Sugiyama.
(Continued)

*Primary Examiner* — Manish S Shah
(74) *Attorney, Agent, or Firm* — Venable LLP

(57) ABSTRACT

Provided is an electrophotographic member in which density unevenness of an image is less likely to occur even in the case of outputting an image after standing in a high-temperature and high-humidity environment for a long period of time. The electrophotographic member includes: an electroconductive substrate; an electroconductive elastic layer on or above the substrate; and an insulating portion on the elastic layer, an outer surface of the electrophotographic member being composed of an outer surface of the insulating portion and an outer surface of the elastic layer that is not covered with the insulating portion, wherein the elastic layer contains a urethane resin as a first resin, and the elastic layer has a region from the outer surface of the elastic layer constituting the outer surface of the electrophotographic member to a depth of 1 μm, the region further containing a second resin.

14 Claims, 6 Drawing Sheets

(51) Int. Cl.
*C08L 33/08* (2006.01)
*C08L 71/12* (2006.01)
*C08L 67/07* (2006.01)
*C08L 33/10* (2006.01)

(52) U.S. Cl.
CPC .............. *C08L 67/07* (2013.01); *C08L 71/12* (2013.01); *G03G 15/1685* (2013.01); *G03G 2215/00683* (2013.01)

(58) Field of Classification Search
CPC ........... G03G 15/0818; G03G 15/0233; G03G 5/14752; G03G 5/14708; G03G 15/08; G03G 21/1839; C08L 33/08; C08L 71/12; C08L 67/07; C08L 33/10
See application file for complete search history.

(56) References Cited

U.S. PATENT DOCUMENTS

| | | | |
|---|---|---|---|
| 7,201,967 B2 | 4/2007 | Sakurai et al. |
| 7,727,134 B2 | 6/2010 | Nakamura et al. |
| 7,797,833 B2 | 9/2010 | Nakamura et al. |
| 7,798,948 B2 | 9/2010 | Kawamura et al. |
| 7,799,398 B2 | 9/2010 | Nakamura et al. |
| 7,979,004 B2 | 7/2011 | Tanaka et al. |
| 8,600,273 B2 | 12/2013 | Yamada et al. |
| 8,655,222 B2 | 2/2014 | Nakamura et al. |
| 8,655,238 B2 | 2/2014 | Uno et al. |
| 8,660,472 B2 | 2/2014 | Kurachi et al. |
| 8,706,011 B2 | 4/2014 | Anan et al. |
| 8,768,226 B2 | 7/2014 | Koyanagi et al. |
| 8,768,227 B2 | 7/2014 | Urushihara et al. |
| 8,774,677 B2 | 7/2014 | Sakurai et al. |
| 8,798,508 B2 | 8/2014 | Yamada et al. |
| 8,837,985 B2 | 9/2014 | Ishida et al. |
| 8,846,287 B2 | 9/2014 | Yamada et al. |
| 8,874,007 B2 | 10/2014 | Kawamura et al. |
| 8,913,930 B2 | 12/2014 | Ishii et al. |
| 9,017,239 B2 | 4/2015 | Ishida et al. |
| 9,482,986 B2 | 11/2016 | Sakurai et al. |
| 9,625,854 B2 | 4/2017 | Koyanagi et al. |
| 9,846,407 B2 | 12/2017 | Nakamura et al. |
| 9,921,518 B2 | 3/2018 | Sakurai et al. |
| 9,952,531 B2 | 4/2018 | Ishii et al. |
| 9,952,532 B2 | 4/2018 | Sugiyama et al. |
| 10,082,741 B2 | 9/2018 | Ishida et al. |
| 10,310,447 B2 | 6/2019 | Morishita et al. |
| 2006/0067747 A1 | 3/2006 | Matsuda et al. |
| 2006/0226572 A1 | 10/2006 | Tanaka et al. |
| 2013/0130022 A1 | 5/2013 | Uesugi et al. |
| 2013/0164038 A1 | 6/2013 | Kusaba et al. |
| 2013/0266339 A1 | 10/2013 | Sugiyama et al. |
| 2014/0079442 A1* | 3/2014 | Yamada .............. G03G 15/0818 399/286 |
| 2016/0252842 A1* | 9/2016 | Sakurai .............. G03G 15/0808 399/286 |
| 2017/0139336 A1 | 5/2017 | Nagaoka et al. |
| 2017/0248867 A1 | 8/2017 | Sakurai et al. |
| 2018/0031997 A1 | 2/2018 | Sugiyama et al. |
| 2019/0265609 A1 | 8/2019 | Sakurai et al. |

FOREIGN PATENT DOCUMENTS

| | | |
|---|---|---|
| JP | H04-88381 | 3/1992 |
| JP | H05-72889 | 3/1993 |
| JP | H06-82958 | 3/1994 |
| JP | 2008-026694 | 2/2008 |
| JP | 2017-156745 | 9/2017 |

OTHER PUBLICATIONS

U.S. Appl. No. 16/434,342, filed Jun. 7, 2019, Toru Ishii.
U.S. Appl. No. 16/524,794, filed Jul. 29, 2019, Shohei Urushihara.
U.S. Appl. No. 16/525,693, filed Jul. 30, 2019, Seiji Tsuru.
U.S. Appl. No. 16/526,125, filed Jul. 30, 2019, Sosuke Yamaguchi.
U.S. Appl. No. 16/540,463, filed Aug. 14, 2019, Noriyuki Doi.
U.S. Appl. No. 16/541,732, filed Aug. 15, 2019, Kazuhito Wakabayashi.
U.S. Appl. No. 16/545,434, filed Aug. 20, 2019, Kenta Matsunaga.
U.S. Appl. No. 16/569,768, filed Sep. 13, 2019, Fumihiko Utsuno.

* cited by examiner

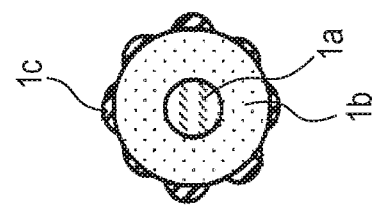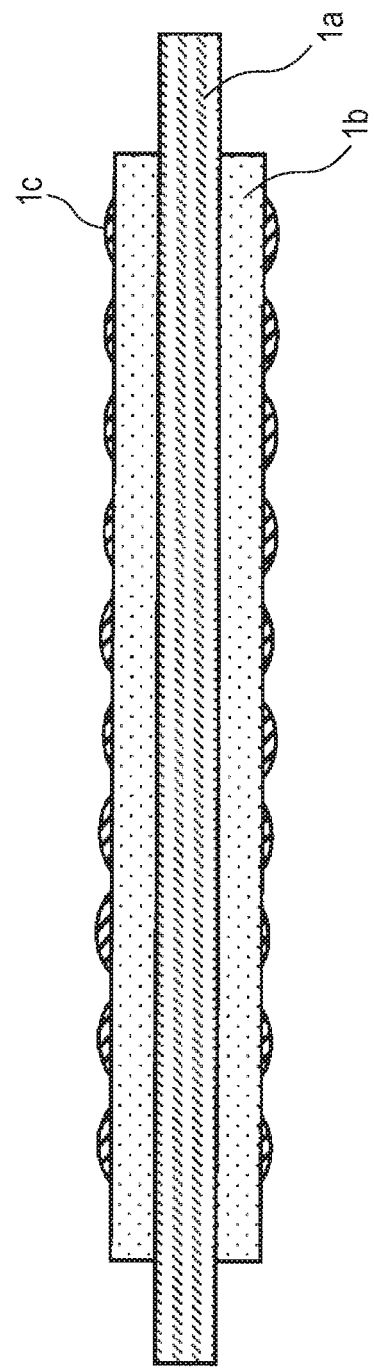

ELECTROPHOTOGRAPHIC MEMBER, ELECTROPHOTOGRAPHIC PROCESS CARTRIDGE, AND ELECTROPHOTOGRAPHIC IMAGE FORMING APPARATUS

BACKGROUND OF THE INVENTION

Field of the Invention

The present disclosure relates to an electrophotographic member used in a developing member, a charging member, or the like, and an electrophotographic process cartridge and an electrophotographic image forming apparatus including the same.

Description of the Related Art

As an image forming method of an electrophotographic image forming apparatus (electrophotographic apparatus) such as a copying machine or an optical printer, a developing method using a non-magnetic one-component toner (hereinafter, referred to as "non-magnetic one-component developing method") has been known. In detail, a photosensitive drum, which is a rotatable electrostatic latent image carrier (image carrier), is charged by, for example, a roller-shaped charging unit, and laser light is exposed on a surface of the charged photosensitive drum to form an electrostatic latent image. Next, in a developing device of the electrophotographic apparatus, a toner in a developer container is applied on, for example, a roller-shaped developing member (developing roller) by a toner regulating member, and the electrostatic latent image is developed by the toner in a contact portion between the photosensitive drum and the developing roller. Thereafter, a toner image on the photosensitive drum is transferred to a recording member such as paper using or without using an intermediate transfer member in a transfer part, the toner image is fixed on the recording member by heat and pressure in a fixation part, and the recording member having a fixed image is discharged to the outside of the electrophotographic apparatus.

In accordance with miniaturization of a body in a recent electrophotographic apparatus, a developing device using the non-magnetic one-component developing method is frequently used. In the non-magnetic one-component developing method, for example, the toner is supplied on the developing roller by an elastic roller (hereinafter, referred to as a "toner supply roller") coming into contact with the developing roller, and the toner is thinly applied on the developing roller by the toner regulating member. At the same time, toner particles are charged by friction with the toner regulating member and friction with the developing roller. Therefore, since the developing roller needs to rotate while maintaining a constant nip width with the toner regulating member or the photosensitive drum, a developing roller having low hardness is required.

Further, as the tendency toward miniaturization and energy saving in the electrophotographic apparatus has been increased, a roller having a reduced torque and a smaller diameter tends to be used as the toner supply roller used in the developing device. In the case of reducing a rotation speed for decreasing a diameter or a torque of the toner supply roller, there was a problem in that a toner conveyance amount to the developing roller was decreased.

Further, as a method of further miniaturizing the electrophotographic apparatus, there is also a developing device which does not use a toner supply roller. However, when there is no toner supply roller, since a unit for supplying the toner to the developing roller is significantly decreased, there was a problem in that a toner conveyance amount was further decreased as compared to the case of decreasing the diameter of the toner supply roller or decreasing the rotation speed.

In order to increase the toner conveyance amount to the developing roller, Japanese Patent Application Laid-Open No. H05-72889 discloses the following developing device. That is, a developing device having a developing roller having a continuous phase (sea portion) and a discontinuous phase (island portion) on at least a surface of a developing roller (developer carrier), formed by blending and molding two or more different kinds of amorphous polymers has been suggested. Further, Japanese Patent Application Laid-Open No. H05-72889 discloses a developing roller in which one of the continuous phase and the discontinuous phase is insulating, and the other is electroconductive.

Japanese Patent Application Laid-Open No. H04-88381 discloses a developing roller of which an elastic surface layer is made of an electroconductive elastomer, insulating particles are dispersed at least in the vicinity of a surface, and some of the particles are exposed to the surface. Further, Japanese Patent Application Laid-Open No. H04-88381 discloses a developing roller where a volume average particle size of a toner to be used is equal to or less than ⅓ of an average particle size of insulating particles exposed to the surface thereof.

According to the study of the present inventors, in the case of operating an electrophotographic apparatus equipped with the developing roller disclosed in Japanese Patent Application Laid-Open No. H05-72889 or H04-88381 after stopping the electrophotographic apparatus for a long time, the following phenomenon may occur.

That is, in the case of outputting image data having a uniform density, an image having so-called density unevenness in which high-density portions and low-density portions are shown may be obtained. This phenomenon was remarkable in the case of operating the electrophotographic apparatus after keeping the electrophotographic apparatus in a high-temperature and high-humidity environment such as a temperature of 30° C. and a relative humidity of 80%.

SUMMARY OF THE INVENTION

An aspect of the present disclosure is directed to providing an electrophotographic member in which density unevenness of an image is less likely to occur even in the case of outputting an image after an electrophotographic apparatus is allowed to stand for a long period of time without being operated. Another aspect of the present disclosure is directed to providing an electrophotographic process cartridge helping in stably forming a high-quality electrophotographic image. Still another aspect of the present disclosure is directed to providing an electrophotographic image forming apparatus capable of stably forming a high-quality electrophotographic image.

According to one aspect of the present disclosure, there is provided an electrophotographic member including: an electroconductive substrate; an electroconductive elastic layer on or above the substrate; and an insulating portion on the elastic layer, wherein an outer surface of the electrophotographic member is composed of an outer surface of the insulating portion and an outer surface of the elastic layer that is not covered with the insulating portion, and the elastic layer contains a urethane resin as a first resin, and the elastic layer has a region from the outer surface of the elastic layer constituting the outer surface of the electrophotographic member to a depth of 1 µm, the region further containing a second resin selected from the group consisting of a polyallyl resin, a vinyl resin, an acrylic resin, and a methacrylic resin.

According to another aspect of the present disclosure, there is provided an electrophotographic process cartridge detachably attachable to an electrophotographic image forming apparatus, including: a developing unit, wherein the developing unit is the electrophotographic member described above.

According to a further aspect of the present disclosure, there is provided an electrophotographic image forming apparatus including: an image carrier carrying an electrostatic latent image; a charging device primarily charging the image carrier; an exposure device forming the electrostatic latent image on the primarily charged image carrier; a developing device developing the electrostatic latent image on a toner to form a toner image; and a transfer device transferring the toner image to a transfer member, wherein the developing device includes the electrophotographic member described above.

According to still further aspect of the present disclosure, there is provided a manufacturing method of an electrophotographic member, the electrophotographic member including: an electroconductive substrate; an electroconductive elastic layer on or above the substrate; and an insulating portion on the elastic layer, an outer surface of the electrophotographic member being composed of an outer surface of the insulating portion and an outer surface of the elastic layer that is not covered with the insulating portion, wherein the elastic layer contains a urethane resin as a first resin, and the elastic layer has a region from the outer surface of the elastic layer constituting the outer surface of the electrophotographic member to a depth of 1 µm, the region further containing a second resin selected from the group consisting of a polyallyl resin, a vinyl resin, an acrylic resin, and a methacrylic resin, the manufacturing method comprising:

i) forming a pre-elastic layer formed on or above the electroconductive substrate, the pre-elastic layer containing the electroconductive first resin;

ii) impregnating a precursor of the second resin in a region from a first surface of the pre-elastic layer opposite to the side facing the substrate up to a depth of at least 1 µm from the surface of the pre-elastic layer, and curing the impregnated precursor; and iii) forming the insulating portion on the first surface of the pre-elastic layer.

Further features of the present disclosure will become apparent from the following description of exemplary embodiments with reference to the attached drawings.

BRIEF DESCRIPTION OF THE DRAWINGS

FIG. 1A is a cross-sectional view parallel to an axial direction of a substrate in an example of a roller-shaped electrophotographic member according to the present disclosure.

FIG. 1B is a cross-sectional view perpendicular to the axial direction of the substrate in the example of the roller-shaped electrophotographic member according to the present disclosure.

DESCRIPTION OF THE EMBODIMENTS

Figure 2B:
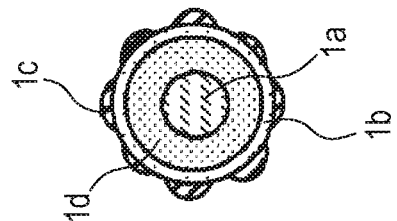
FIG. 2B is a cross-sectional view perpendicular to the axial direction of the substrate in another example of the roller-shaped electrophotographic member according to the present disclosure.

In an electrophotographic apparatus using a developing roller having an insulating region (insulating portion); and an exposed electroconductive elastic layer (hereinafter, referred to as an "electroconductive portion") on an outer surface thereof, disclosed in Japanese Patent Application Laid-Open Nos. H05-72889 and H04-88381, charge is accumulated in the insulating portion by triboelectric charging between the developing roller and a toner and voltage application from the outside. In this case, when the insulating portion and the electroconductive portion are exposed to a surface of the developing roller, there is a potential difference between the insulating portion and the electroconductive portion. A minute electric field is formed by the potential difference and a gradient force is generated. The gradient force, which is a force generated toward the center in the case of cutting perpendicularly to an axial direction of the developing roller, attracts the toner to the developing roller. As a result, the developing roller rotates in a state in which the toner is attracted, such that the toner is conveyed onto a photosensitive drum.

In the case of operating an electrophotographic apparatus using a developing roller conveying a toner using a gradient force after allowing the electrophotographic apparatus to stand in a high-temperature and high-humidity environment for a long period of time without being operated, density unevenness may be shown in an obtained image as described above.

Therefore, the present inventors investigated the cause of the occurrence of the density unevenness. As a result, it was found that one of the causes was a decrease in volume resistivity due to moisture absorption in the insulation portion present on an outer surface portion of the developing roller exposed to an opening portion of the cartridge.

Although the occurrence of the density unevenness could be suppressed to some degree by suppressing a moisture absorption property of the insulating portion, there is still room for improvement.

Meanwhile, the present inventors found that the occurrence of the density unevenness could be significantly decreased by decreasing a moisture absorption property of the electroconductive elastic layer.

That is, it is thought that one of the causes of the occurrence of the density unevenness is the moisture absorption property of the electroconductive elastic layer of the developing roller. As a result of investigating this fact, the present inventors found that in the case of using a material having a high moisture absorption property in the developing roller, density unevenness significantly occurred for the following reason. In the case of using the material having a high moisture absorption property, moisture in the elastic layer is diffused in the elastic layer, and the moisture migrates and adheres to the insulating portion. Charge accumulated in the insulating portion is easily leaked through the elastic layer by the adhered moisture. Further, volume resistivity of the insulating portion is decreased by the moisture, such that the gradient force is likely to be decreased.

Therefore, when the electrophotographic apparatus is not operated for a long period of time in a high-temperature and high-humidity environment, a humidity in the vicinity of an outer peripheral surface of the developing roller that is exposed to the opening portion of the cartridge and a humidity in the vicinity of an outer peripheral surface of the developing roller that is not exposed are different from each other. As a result, portions in which a moisture absorption amount is large and portions in which the moisture absorption amount is small are present in the elastic layer in a circumferential direction of the developing roller. That is, a moisture absorption amount of the outer peripheral surface of the developing roller that is exposed to the opening portion is larger than that of the outer peripheral surface of the developing roller that is not exposed. When the moisture absorption amounts in the circumferential direction of the developing roller are different from each other, a degree of decrease in the charges of the insulating portion and a degree of decrease in the volume resistivity change occurs in the circumferential direction. Therefore, since the gradient force generated in the circumferential direction of the developing roller is different, there is a difference in force attracting the toner in the circumferential direction. This difference causes a difference in the toner conveyance amount in the circumferential direction of the developing roller, such that density unevenness occurs.

Therefore, the present inventors thought that moisture absorption of the elastic layer could be suppressed by allowing the elastic layer to contain a resin having a low moisture absorption property such as a polyallyl resin, a vinyl resin, an acrylic resin, or a methacrylic resin in the vicinity of the surface of the elastic layer. When the moisture absorption property of the elastic layer is suppressed, moisture diffused in the elastic layer can be decreased, and an amount of moisture adhered to the insulating portion is decreased. As a result, moisture absorption in an outer peripheral portion of the developing roller that is exposed to the opening portion is suppressed, such that a difference in the moisture absorption amount between the outer peripheral portion and the portion that is not exposed can be suppressed. It is thought that it is possible to suppress the charge leakage of the insulating portion and a decrease in the volume resistivity to suppress charge unevenness, that is, unevenness of the gradient force, to suppress the density unevenness, which leads to the present disclosure. Further, the present inventors found that density unevenness can be further suppressed by additionally using a resin having a low moisture absorption property in the insulating portion.

<Electrophotographic Member>

An electrophotographic member according to an aspect of the present disclosure can be used as an electrophotographic member such as a developing member or a charging member in an electrophotographic apparatus such as a printer. Further, the electrophotographic member according to the present disclosure can be preferably used as an electrophotographic roller such as a developing member (for example, a roller-shaped developing member (developing roller)) provided particularly in a developing device. Hereinafter, in describing the electrophotographic member according to the present disclosure, the developing roller is mainly described, but the application of the present disclosure is not limited thereto.

Figure 2A:
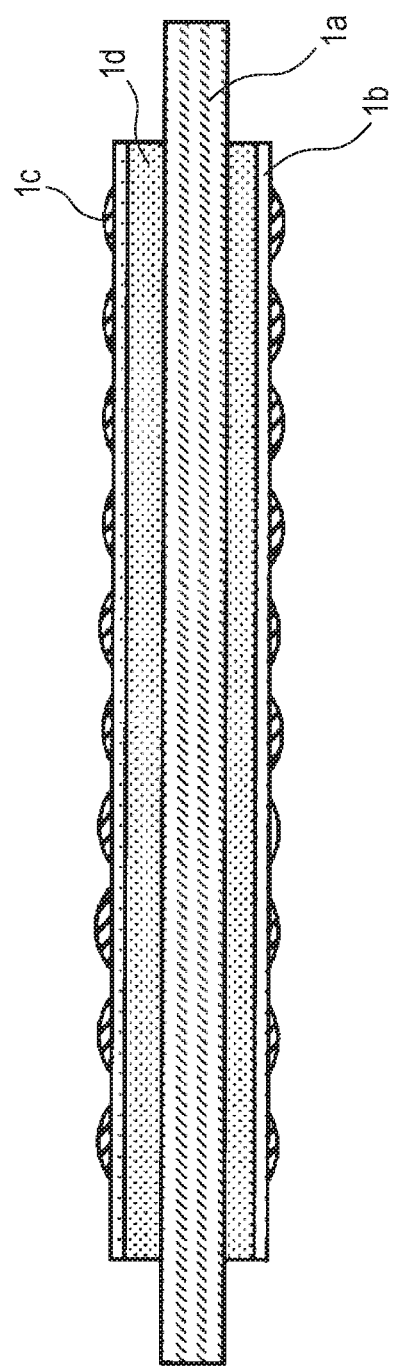
FIG. 2A is a cross-sectional view parallel to an axial direction of a substrate in another example of the roller-shaped electrophotographic member according to the present disclosure.
Figure 3:
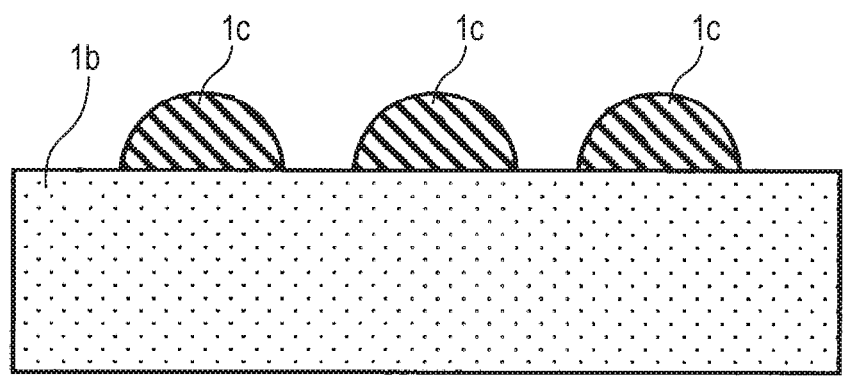
FIG. 3 is a schematic partial cross-sectional view of the electrophotographic member according to the present disclosure.

FIGS. 1A to 2B illustrate cross-sectional views of two examples of the electrophotographic member (developing roller) according to the aspect of the present disclosure. Further, FIG. 3 illustrates a schematic partial cross-sectional view of the electrophotographic member according to the present aspect. FIGS. 1A and 2A are cross-sectional views at the time of cutting the electrophotographic member parallel to an axial direction of an electroconductive substrate $1a$, and FIGS. 1B and 2B are cross-sectional views at the time of cutting the electrophotographic member perpendicularly to the axial direction of the electroconductive substrate $1a$. FIG. 3 is a partially enlarged cross-sectional view of an elastic layer $1b$ and an insulating portion $1c$.

As illustrated in FIGS. 1A and 1B, the electrophotographic member includes the electroconductive substrate $1a$; an electroconductive elastic layer $1b$ disposed on an outer peripheral surface of the substrate (on the substrate) and containing a urethane resin corresponding to a first resin; and the insulating portion $1c$ disposed on an outer peripheral surface of the elastic layer $1b$ (on the elastic layer).

Further, if necessary, the electrophotographic member may further include one or more different layers (for example, another elastic layer, or the like) provided between the electroconductive elastic layer $1b$ containing the urethane resin and the electroconductive substrate $1a$. A case in which another elastic layer $1d$ is provided between the elastic layer $1b$ and the substrate $1a$ is illustrated in FIGS. 2A and 2B.

In the electrophotographic member, the insulating portion $1c$ partially covers the electroconductive elastic layer $1b$ (hereinafter, referred to as the "elastic layer") containing the urethane resin. In FIGS. 1A to 2B, the insulating portions are disposed on the elastic layer $1b$ in a circumferential direction and the axial direction (longitudinal direction) at substantially equal intervals, and are dispersed on an outer peripheral surface of the electrophotographic member. In other words, a surface of the electrophotographic member includes surfaces of the insulating portions and a surface of the elastic layer that is not covered with the insulating portions.

First, the presence of the insulating portion and the electroconductive elastic layer (electroconductive portion) can be confirmed by observing the presence of two or more regions on the outer surface of the developing roller using an optical microscope, a scanning electron microscope, or the like.

Further, the insulating portion is electrically insulating and the electroconductive portion has a higher electroconductivity than that of the insulating portion, which can be confirmed by measuring residual potential distribution after charging the outer surface of the developing roller including the insulating portion and the electroconductive portion. The residual potential distribution can be confirmed by sufficiently charging the outer surface of the developing roller using a charging device such as a corona discharging device or the like and then measuring residual potential distribution of the outer surface of the charged developing roller using an electrostatic force microscope (EFM) or a Kelvin probe force microscope (KFM).

Further, an electrical insulation property of an electrical insulating portion constituting the insulating portion or electroconductivity of the electroconductive portion can be evaluated by a potential decay time constant (hereinafter, referred to as a "time constant") of the residual potential as well as volume resistivity. The time constant of the residual potential, which is a time taken for the residual potential to decay to 1/e of an initial value, is an indicator of ease of holding charged potential. Here, e is a base of natural logarithm. When the time constant of the electrical insulating portion is 60.0 seconds or more, which is preferable in that the electrical insulating portion is rapidly charged, and it is easy to hold a potential by the charging.

Further, the time constant of the electroconductive layer is less than 6.0 seconds, which is preferable in that charging of the electroconductive layer is suppressed and thus it is easy to generate a potential difference between the electroconductive layer and the charged electrical insulating portion and generate a gradient force. Further, in measuring the time constant in the present disclosure, when a residual potential is approximately 0 V at a measurement initial time point in the following measuring method, that is, when the potential is completely decayed at the measurement initial time point, it is considered that the time constant at this time point is less than 6.0 seconds. The time constant of the residual potential can be obtained by sufficiently charging the outer surface of the developing roller using a charging device such as a corona discharging device or the like and then measuring a time-dependent change in the residual potential of the insulating portion and the electroconductive portion on the charged outer surface of developing roller using an electrostatic force microscope (EFM).

Here, the outer surface of the electrophotographic member is typically a surface of the electrophotographic member coming into contact with another member (a toner supply roller, a toner regulating member, an image carrier, or the like).

In addition, it is preferable that the volume resistivity of the insulating portion (insulator) is, for example, $1.0 \times 10^{13}$ Ω·cm or more. Further, it is preferable that the volume resistivity of the electroconductive elastic layer is lower than that of the insulating portion. More specifically, it is preferable that the volume resistivity of the electroconductive elastic layer is, for example, $1.0 \times 10^{12}$ Ω·cm or less.

It is possible to control the volume resistivity of the electroconductive portion in the above-mentioned range, for example, by adding an electroconductive agent to the elastic layer containing the urethane resin.

A region from the outer surface of the electroconductive portion to a depth of 1 μm contains a polyallyl resin, a vinyl resin, an acrylic resin, or a methacrylic resin, which is a second resin.

Hereinafter, each configuration member in the electrophotographic member according to the present aspect will be described in more detail.

(Electroconductive Substrate)

In the case in which the electroconductive substrate (hereinafter, also referred to as a "shaft core body") is used in the electrophotographic member such as the developing roller or the like, any electroconductive substrate can be suitably used as long as it serves as an electrode of the electrophotographic member and a member supporting the elastic layer, and the like. A shape of the substrate is not particularly limited, and a hollow cylindrical or solid cylindrical substrate can be suitably used. Further, as a material of the substrate, for example, a metal or an alloy such as aluminum, copper, stainless steel, or iron, or an electroconductive material such as an electroconductive synthetic resin can be used. In addition, a well-known adhesive may be applied onto a surface of the substrate in order to improve adhesion with the elastic layer to be provided on an outer peripheral surface of the substrate.

(Elastic Layer)

The elastic layer disposed on or above the substrate has at least an electroconductive elastic layer portion (conductive portion) exposed to the outer surface of the electrophotographic member; and a portion formed by covering a portion of the electroconductive layer with the insulating portion. In addition, hereinafter, the elastic layer portion covered with the insulating portion may be referred to as an "insulation covered portion". Further, the elastic layer can be composed of the electroconductive portion and the insulation covered portion.

In addition, the elastic layer may have another layer thereon other than the insulating portion. In this case, the elastic layer has an elastic layer portion covered with another layer.

The elastic layer including the electroconductive portion and the insulation covered portion contains at least the urethane resin (the urethane resin may be a urethane rubber) corresponding to the first resin. In view of suppressing stress to the toner, there is a need to use a resin having a low hardness in the elastic layer, but generally, in the case of using the resin having a low hardness, mechanical strength tends to decrease. Therefore, in the present disclosure, a urethane resin that is flexible and has high mechanical strength is used in the elastic layer. Further, the following effect is obtained by using the urethane resin at the time of impregnating an acrylic resin or methacrylic resin into the elastic layer. That is, since a crosslinking density of a soft segment of the urethane resin is low, the second resin can be effectively impregnated, such that it is possible to easily manufacture the electrophotographic member according to the present disclosure.

As the urethane resin used in the elastic layer, a material known in the art can be suitably used. For example, a monomer (for example, isocyanate and polyol) for forming a urethane resin or a prepolymer can be used.

Examples of the isocyanate can include aliphatic polyisocyanates such as ethylene diisocyanate and 1,6-hexamethylene diisocyanate (HDI), alicyclic polyisocyanates such as isophorone diisocyanate (IPDI), cyclohexane-1,3-diisocyanate, and cyclohexane-1,4-diisocyanate, aromatic isocyanates such as 2,4-tolylene diisocyanate, 2,6-tolylene diisocyanate (TDI), 4,4-diphenylmethane diisocyanate (MDI), polymeric diphenylmethane diisocyanate, xylene diisocyanate, and naphthalene diisocyanate, and copolymers thereof or isocyanate compounds such as isocyanulates, TMP adducts, biurets, and blocks thereof.

Examples of the polyol can include polyether polyol and polyester polyol.

Examples of the polyether polyol can include polyethylene glycol, polypropylene glycol, and polytetramethylene glycol.

Further, examples of the polyester polyol can include diol components such as 1,4-butanediol, 3-methyl-1,4-pentanediol, and neopentyl glycol, triol components such as trimethylol propane, and polyester polyols obtained by a condensation reaction of dicarboxylic acid such as adipic acid, anhydrous phthalic acid, terephthalic acid, and hexahydroxyl phthalic acid.

The prepolymer of the urethane resin is a polymer compound having an isocyanate group in a molecular terminal obtained by reacting polyol and excess isocyanate or a polymer compound having a hydroxyl group in a molecular terminal obtained by reacting excess polyol and isocyanate. The prepolymer can be obtained, for example, by reacting the above-mentioned polyol with isocyanate such as 2,4-tolylene diisocyanate (TDI), 1,4-diphenyl methane diisocyanate (MDI), and isophorone diisocyanate (IPDI) to extend a chain. Further, the urethane resin can be prepared by reacting an isocyanate group in the terminal of the prepolymer with moisture in the air or the polyol with each other.

A content (blending amount) of the urethane resin in the elastic layer is preferably 20 mass % or more in view of mechanical strength.

In addition, the elastic layer can contain carbon black as an electroconductive agent. Examples of the carbon black can include carbon black having high electroconductivity such as "EC300J" or "EC600JD" (all trade names, manufactured by Lion Specialty Chemicals Co. Ltd.), carbon black for rubber having intermediate electroconductivity, and carbon black for paints.

Among these carbon blacks, it is preferable to use the carbon black for paints in view of controlling dispersibility and electroconductivity. It is preferable that a content (blending amount) of carbon black in the elastic layer is 3 mass % or more in view of electroconductivity and 50 mass % or less in view of rubber elasticity when a total amount of resin components (for example, the urethane resin and a second resin to be described below) is 100 mass %.

Further, the elastic layer can contain other additives in addition to carbon black. Examples of the other additives can include spherical resin particles for forming uneven portions on the surface, a reinforcing material, a surface modifier, a charging control agent, and the like. In the case of increasing elasticity of the resin particles at the time of using the spherical resin particles for providing uneven portions on the surface, since a moisture absorption amount is decreased in view of a crosslinking density as the resin particles, adhesion of moisture to the insulating portion by moisture absorption can be suppressed, such that density unevenness can be suppressed.

In addition, a resin constituting the insulating portion to be described below may be contained in the elastic layer (for example, a region from the surface of the elastic layer to a depth of 1 μm).

(Electroconductive Portion)

The electroconductive portion is a portion of the elastic layer which is not covered with the insulating portion and is exposed on the outer surface of the electrophotographic member. In the electrophotographic member according to the present disclosure, the second resin is contained in a region from a surface (outer surface) of the electroconductive portion, that is, (a position of) the surface of the elastic layer constituting a portion of the outer surface of the electrophotographic member to (a position of) a depth (thickness) of 1 μm. This means that at least one kind selected from the group consisting of a polyallyl resin, a vinyl resin, an acrylic resin, and a methacrylic resin is additionally contained in addition to the above-mentioned urethane resin, carbon black, and the like.

As described above, by allowing the second resin to be contained in the region of the electroconductive portion, moisture absorption of the elastic layer (particularly, an outer surface portion exposed to the opening portion of the cartridge) is suppressed at the time of allowing the electrophotographic member to stand for a long period of time without being operated. Therefore, even in the case of outputting an image after the electrophotographic member is not operated for a long period of time in a high-temperature and high-humidity environment, it is possible to obtain an image in which there is no density unevenness.

Further, the second resin may be contained in the region from (the position of) the surface of the electroconductive portion to (the position of) the depth of 1 μm. That is, the second resin may be contained in a region of at least 1 μm, for example, intermittently in a depth direction from the surface of the electroconductive portion. The second resin may be contained in another region other than the region up to a depth of 1 μm including the surface of the electroconductive portion. Examples of the another region can include a region between the position of the depth of 1 μm from the surface of the electroconductive portion and a depth of 2 or 3 μm. In this case, the second resin is contained in the region from (the position of) the surface of the electroconductive portion to (a position of) the depth of 2 or 3 μm. However, in view of maintaining flexibility of the elastic layer, it is preferable that the second resin is present within a region from (the position of) the surface of the elastic layer (for example, the electroconductive portion) to (a position of) a depth of 5 μm.

Hereinafter, a preferable second resin will be described.

Examples of the second resin can include resins having a structural unit shown in Structural Formula (1).

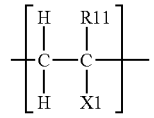

Structural Formula (1)

In Structural Formula (1), R11 represents a hydrogen atom or a methyl group. X1 represents COOR12, CH$_2$OR13, OCOR14, or —R15. R12 represents a hydrocarbon group having 1 to 18 carbon atoms or a structure represented by (R121O)$_{n1}$-R122. R121 represents a hydrocarbon group having 2 to 3 carbon atoms, R122 represents a hydrocarbon group having 1 to 12 carbon atoms, and n1 is an integer of 1 to 13. R13 represents one group selected from the group consisting of an alkyl group having 1 to 8 carbon atoms, an aryl group having 6 to 7 carbon atoms, and an acyl group having 1 to 6 carbon atoms. R14 represents an alkyl group having 1 to 15 carbon atoms or an aryl group having 6 to 10 carbon atoms. Further, R15 represents an aryl group having 6 to 14 carbon atoms.

In Structural Formula (1), examples of the R12 (the hydrocarbon group having 1 to 18 carbon atoms) can include a (linear, branched, or cyclic) alkyl group such as an n-octyl group, an isobonyl group, a dodecyl group, a tetradecyl group, and an octadecyl group; a phenyl group; and the like.

In Structural Formula (1), examples of the (R121O)$_{n1}$-R122 (R121 represents a hydrocarbon group having 2 to 3 carbon atoms, and R122 represents a hydrocarbon group having 1 to 12 carbon atoms) can include the following structure. That is, a methoxy polyethylene glycol structure, a methoxy polypropylene glycol structure, an ethoxy polyethylene glycol structure, a phenoxy (poly)ethylene glycol structure, an ethoxylated lauryl structure, and the like can be mentioned.

By setting the number of carbon atoms of R13, R14, and R15 to the above-mentioned range, it is possible to suppress the moisture absorption property of the elastic layer while maintaining the flexibility of the urethane resin. As a result, it is possible to decrease a difference in gradient force generated in the circumferential direction of an electrophotographic roller available as a developing roller, such that it is possible to suppress density unevenness.

Further, examples of the R13 in Structural Formula (1) can include (linear, branched or cyclic) alkyl groups such as an n-octyl group; aryl groups such as a phenyl group and an o-tolyl group; and acyl groups such as an acetyl group, a hexionyl group, a heptionyl group, a benzoyl group, and a 3-cyclohexylpropionyl group.

Examples of the R14 in Structural Formula (1) include (linear, branched, or cyclic) alkyl groups such as a propyl group, a heptyl group, an octyl group, a nonyl group, a decyl group, a tridecyl group, and a pentadecyl group; and aryl groups such as a phenyl group and a 4-tert-butylphenyl group.

Further, examples of the R15 in Structural Formula (1) can include aryl groups such as a phenyl group, a 4-tert-butyl phenyl group, a 4-octyl phenyl group, and a 2-methyl phenyl group.

Here, the resin having the structural unit represented in Structural Formula (1) can be prepared using (for example, polymerizing) the following monomer. In addition, a compound (monomer) thereof may be used alone, and two or more thereof may be used in combination.

i) In the case in which R11 is —H or —CH$_3$ and X1 is —COOR12, when R12 is a hydrocarbon group having 1 to 18 carbon atoms, a 4-tert-butylcyclohexanol (meth)acrylate monomer (R12: corresponding to a 4-tert-butylcyclohexyl group), a stearyl (meth)acrylate monomer (R12: corresponding to an octadecyl group), a lauryl (meth)acrylate monomer (R12: corresponding to a dodecyl group), an isodecyl (meth) acrylate monomer (R12: corresponding to an isodecyl group), an isooctyl (meth)acrylate monomer (R12: corresponding to an isooctyl group), or an isobornyl (meth) acrylate monomer (R12: corresponding to an isobornyl group) can be mentioned.

Further, when R12 is-(R121O)$_{n1}$-R122 (R121 represents a hydrocarbon group having 2 to 3 carbon atoms and R122 represents a hydrocarbon group having 1 to 12 carbon atoms), 2-phenoxyethyl (meth)acrylate (R12: corresponding to a 2-phenoxyethyl group), a methoxypolyalkylene glycol (meth)acrylate monomer (R12: corresponding to a methoxypolyalkylene structure), and a butoxypolyalkylene (meth)acrylate monomer (R12: corresponding to a butoxypolyalkylene structure) can be mentioned.

ii) When R11 is —H or —CH$_3$ and X1 is —CH$_2$OR13, an allyl acetate monomer (R13: corresponding to an acetyl group), an allyl phenyl ether monomer (R13: corresponding to a phenyl group), an allyl n-octyl ether monomer (R13: corresponding to an n-octyl group), an allyl o-tolyl ether monomer (R13: corresponding to an o-tolyl group), an allyl hexanoate monomer (R13: corresponding to a hexionyl group), an allyl heptanoate monomer (R13: corresponding to a heptionyl group), an allyl benzoate monomer (R13: corresponding to a benzoyl group), and an allyl cyclohexane propionate monomer (R13: corresponding to a 3-cyclohexylpropionyl group) can be mentioned.

iii) When R11 is —H or —CH$_3$, and X1 is —OCOR14, a vinyl butyrate monomer (R14: corresponding to a propyl group), a vinyl benzoate monomer (R14: corresponding to a phenyl group), a vinyl 4-tert-butylbenzoate monomer (R14: corresponding to a 4-tert-butylphenyl group), a vinyl octanoate monomer (R14: corresponding to a heptyl group), a vinyl decanoate monomer (R14: corresponding to a nonyl group), and a vinyl palmitate monomer (R14: a pentadecyl group) can be mentioned.

iv) When R11 is —H or —CH$_3$, and X1 is R15, a styrene monomer (R15: corresponding to a phenyl group), a 4-tert-butylstyrene monomer (R15: corresponding to a 4-tert-butylphenyl group), a 4-octylstyrene monomer (R15: corresponding to a 4-octylphenyl group), and a 2-vinyltoluene (R15: corresponding to a 2-methylphenyl group) can be mentioned.

It is also preferable to use a resin having a structure in which a part of the structure represented by General Formula (1) is crosslinked via a partial structure represented by the following Structural Formula (2). In the case of using a resin having such a structure, a crosslinking density can be further increased as compared to the resin having Structural Formula (1). As a result, moisture absorption of the outer peripheral surface portion exposed to the opening portion of the cartridge can be further suppressed.

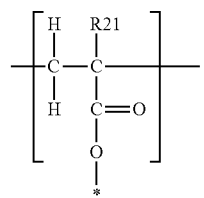

Structural Formula (2)

In Structural Formula (2), R21 represents a hydrogen atom or a methyl group, and the symbol "*" represents a binding moiety to a carbon atom in a linking group R22. The linking group R22 is a divalent or trivalent group consisting of only carbon atoms and hydrogen atoms, or only carbon atoms, hydrogen atoms, and oxygen atoms, and two or three repeating units represented by Structural Formula (2) are linked via the linking group R22.

Further, it is preferable that the linking group R22 includes a resin having one structure selected from a divalent hydrocarbon groups having 2 to 12 carbon atoms and the group consisting of Structural Formulas (3) to (5).

—(R31-O)$_{n31}$-R32-(O—R33)$_{n32}$- Structural Formula (3)

(In Structural Formula (3), R31 and R33 each independently represent a hydrocarbon group having 2 to 3 carbon atoms, R32 represents a hydrocarbon group having 5 to 6 carbon atoms, and n31 and n32 each independently represent an integer of 1 or more and 2 or less. The symbol "**" represents a binding moiety to a moiety represented by the symbol "*" in Structural Formula (2).);

—(R41-O)$_{n41}$-R42- Structural Formula (4)

(In Structural Formula (4), R41 and R42 each independently represent a hydrocarbon group having 2 to 4 carbon atoms, n41 represents an integer of 1 to 13, and the symbol "**" represents a binding moiety to a moiety represented by the symbol "*" in Structural Formula (2).); and

—(R51-O—C(=O)—R52)- Structural Formula (5)

(In Structural Formula (5), R51 represents a hydrocarbon group having 5 carbon atoms, R52 represents a hydrocarbon group having 4 carbon atoms, and the symbol "**" represents a binding moiety to a moiety represented by the symbol "*" in Structural Formula (2).).

When the linking group R22 is a divalent hydrocarbon group having 2 to 18 carbon atoms, for example, when a 1,4-butanediol di(meth)acrylate monomer (CH$_2$=CHCOO (CH$_2$)$_4$OCOCH=CH$_2$) is polymerized, the linking group R22 is a butane-1,4-diyl group (*—CH$_2$CH$_2$CH$_2$CH$_2$—*), and moieties represented by "*" are bound to two oxygen atoms presented in Structural formula (2), respectively.

Examples of the linking group R22 in Structural Formula (2) can include the following groups or structures. That is, a butane-1,3-diyl group, a butane-1,4-diyl group, a hexane-1,6-diyl group, a 2,2-dimethylpropylene structure, and a nonane-1,9-diyl group structure can be mentioned.

When the linking group R22 in Structural Formula (2) is represented by Structural Formula (3), examples thereof can include an ethoxylated hexyl structure, a propoxylated hexyl structure, and a propoxylated neopentyl structure.

When the linking group R22 in Structural Formula (2) is represented by Structural Formula (4), examples thereof can include a polyethylene glycol structure, a polypropylene structure, and a polytetramethylene structure.

When the linking group R22 in Structural Formula (2) is represented by Structural Formula (5), examples thereof can include a neopentyl hydroxypivalate structure and the like.

Here, the resin having the structural unit represented in Structural Formula (2) can be prepared using (for example, polymerizing) the following monomer. In addition, a compound (monomer) thereof may be used alone, and two or more thereof may be used in combination.

When the linking group R22 is a divalent hydrocarbon group having 2 to 12 carbon atoms, specific examples of the above-mentioned monomer can include a 1,3-butylene glycol di(meth)acrylate monomer (R22: butane-1,3-diyl group), a 1,4-butanediol di(meth)acrylate monomer (R22: butane-1,4-diyl group), a 1,6-hexanediol di(meth)acrylate monomer (R22: hexane-1,6-diyl group), a neopentyl glycol di(meth)acrylate monomer (R22: 2,2-dimethylpropylene structure), a 1,9-nonanediol di(meth)acrylate monomer (R22: nonane-1, 9-diyl group), and 1,10-decanediol di(meth)acrylate monomer (R22: decane-1,10-diyl group) and the like.

When the linking group R22 is represented by Structural Formula (3), for example, an ethoxylated hexanediol di(meth)acrylate monomer (ethoxylated hexyl structure), a propoxylated hexanediol di(meth)acrylate monomer (propoxylated hexyl structure), a propoxylated neopentyl glycol di(meth)acrylate monomer (propoxylated neopentyl structure), and the like can be mentioned.

When the linking group R22 is represented by Structural Formula (4), for example, a polyethylene glycol di(meth)acrylate monomer (polyethylene glycol structure), a polypropylene glycol di(meth)acrylate monomer (polypropylene structure), a polytetramethylene glycol di(meth)acrylate monomer (polytetramethylene structure), and the like can be mentioned.

When the linking group R22 is represented by Structural Formula (5), for example, a hydroxy pivalic acid neopentyl glycol diacrylate monomer (hydroxy pivalic acid neopentyl structure), and the like can be mentioned.

The number of partial structures represented by Structural Formula (2) is three, it is preferable that the structure linked by the linking group R22 is represented by Structural Formula (6).

Structural Formula (6)

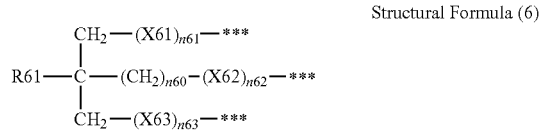

In Structural Formula (6), R61 represents a hydrogen atom, a methyl group, or an ethyl group, and the symbol "***" represents a binding moiety to a moiety represented by the symbol "*" in Structural Formula (2), X61 to X63 each independently represent $—OCH_2CH_2—$ or $—OCH_2CH(CH_3)—$, n60 represents an integer of 0 or 1, n61 to n63 each independently represent an integer of 0 or 1 or more, and n61+n62+n63 is an integer of 3 or more and 9 or less.

By setting the linking group R22 to be represented by Structural Formula (6), the crosslinking density of the second resin can be further increased, and as a result, moisture absorption of the outer surface portion exposed to the opening portion of the cartridge can be suppressed.

Here, the resin having the structural unit represented in Structural Formula (6) can be prepared using (for example, polymerizing) the following monomer. In addition, a compound (monomer) thereof may be used alone, and two or more thereof may be used in combination.

Specific examples of the above monomer can include trimethylolpropane triacrylate, ethoxylated trimethylolpropane triacrylate, propoxylated trimethylolpropane triacrylate, ethoxylated glycerin triacrylate, propoxylated glycerin triacrylate, and the like.

(Insulation Covered Portion)

The insulation covered portion means a portion of the elastic layer covered with the insulating portion. In the electrophotographic member according to the present disclosure, it is preferable that an acrylic resin or methacrylic resin is contained in a boundary portion between the insulation covered portion and the insulating portion, that is, a region from (a position of) a surface of the insulation covered portion (at the insulation portion side) to (a position of) a depth (thickness) of 1 μm. In this way, moisture absorption of the outer surface portion of the developing roller exposed to the opening portion of the cartridge can be further suppressed, and further, it is possible to suppress moisture from adhering to the insulating portion, such that even in the case of outputting an image after allowing the electrophotographic member to stand in a high-temperature and high-humidity environment for a long period of time, an image without density unevenness can be easily obtained.

In addition, similarly to the electroconductive portion, the second resin may be contained in another region other than a region up to 1 μm including the surface of the insulation covered portion. Examples of the another region can include a region between the position of the depth of 1 μm (without including the position of the depth of 1 μm) from the surface of the insulation covered portion and a depth of 2 or 3 μm. However, in view of maintaining flexibility of the elastic layer, it is preferable that the second resin is present within a region from (the position of) the surface of the elastic layer (for example, the insulation covered portion) to (a position of) a depth of 5 μm.

As described above, in the electrophotographic member, in view of preventing density unevenness from occurring, it is preferable that the second resin described above is further contained in the region from (the position of) the surface of the elastic layer up to (the position of) the depth of 1 μm in an entire elastic layer (including the electroconductive portion and the insulation covered portion).

In a region where both the urethane resin and the second resin are present, a total content of the second resin in the elastic layer is preferably 20 mass % or more in view of moisture adhesion, and 80 mass % or less in view of flexibility of the elastic layer.

The second resin is contained in the elastic layer, which can be confirmed, for example, by the following method. That is, the presence of the second resin can be confirmed by delaminating the insulating portion from a manufactured electrophotographic member and analyzing the surface of the elastic layer using a microscopic infrared spectroscopy (microscopic IR). Further, in the case in which it is desired to confirm the presence of the specific resin in a position of a specific depth from the surface of the elastic layer, the surface of the elastic layer surface may be polished up to the position of the specific depth (for example, with a rubber roll mirror surface processing machine or the like), and then analysis may be performed using a microscopic IR. In addition, a detailed structure of the second resin can be identified using nuclear magnetic resonance (NMR) and gas chromatography mass spectrometer (GC/MS).

In addition, it is preferable that a volume resistivity of the insulation covered portion is $1.0 \times 10^{13}$ Ω·cm or more.

(Thickness of Elastic Layer)

As illustrated in FIGS. 2A and 2B, when an inner layer 1d to be described later is provided between the electroconductive substrate 1a and the elastic layer 1b, the thickness of the elastic layer 1b which is the outermost layer of the elastic layer is preferably 4 μm or more and 50 μm or less, and more preferably, 5 μm or more and 45 μm or less. By setting the thickness of the elastic layer to 4 μm or more, contamination of a photosensitive drum and the like due to the exudation of low molecular weight components in the inner layer can be easily prevented, and the elastic layer can be easily prevented from being delaminated. Further, by setting the thickness of the elastic layer to 50 μm or less, a surface hardness of the electrophotographic member can be easily maintained at a suitable hardness, and degradation of the toner can be easily prevented. In this case, it is preferable that a thickness of the inner layer is 1.0 mm or more and 5.0 mm or less in view of coming into contact with the photosensitive drum while having a suitable area.

Further, in the case in which only one electroconductive elastic layer is present without the inner layer, the thickness of the elastic layer 1b is preferably 1.0 mm or more and 5.0 mm or less in view of coming into contact with the photosensitive drum while having a suitable area.

(Insulating Portion)

The insulating portion is disposed on the elastic layer and covers a portion of the elastic layer to constitute a part of the outer surface of the electrophotographic member.

The insulating portions may be scattered on the elastic layer, or the insulating portions may be connected to the extent that the elastic layer is exposed.

Here, it is preferable that at least portions of the insulating portions disposed on the elastic layer are disposed (scattered) on the elastic layer at a certain interval, specifically, an interval of 5 μm or more and 300 μm or less. Due to this interval, in the case of using the electrophotographic member, a gradient force can be efficiently generated, and the toner can be favorably conveyed by the gradient force.

In addition, as illustrated in FIGS. 1A to 2B, the all insulating portions may be disposed on the elastic layer at intervals (for example, substantially equal intervals).

Therefore, a gradient force is uniformly generated over the entire surface of the elastic layer, and the toner can be uniformly conveyed. In this case, as described above, in view of effective generation of the gradient force, it is preferable that a distance between insulating portions disposed on the elastic layer at a certain interval is 5 μm or more and 300 μm or less.

Further, in the outer surface of the electrophotographic member, it is preferable that a coverage ratio of the insulating portion is 20% or more and 80% or less. By setting the coverage ratio in this range, in the case of using the electrophotographic member, a gradient force can be efficiently generated, and the toner can be favorably conveyed by the gradient force.

A shape of the insulating portion is not particularly limited, but the insulating portion may have any shape.

Further, it is preferable that an average height of the insulating portion (an average thickness from the surface of the insulation covered portion) is 0.5 μm or more and 30 μm or less. By setting the average height within this range, in the case of using the electrophotographic member, a gradient force can be efficiently generated, and the toner can be favorably conveyed by the gradient force.

An arrangement interval, the coverage ratio, and the average height (height) of the insulating portions can be measured by the following method. That is, as for the arrangement interval, a distance between adjacent insulating portions is measured at 30 arbitrarily selected positions using an optical microscope, and an average value thereof is taken as the arrangement interval. Further, as for the coverage ratio, a coverage area ratio of the insulating portion in each image is obtained from an observation image at 30 arbitrarily selected positions using an optical microscope, and an average value thereof is calculated as the coverage ratio. Further, as for the average height, heights of 30 insulating portions arbitrarily selected are measured using an optical microscope, and an average value is taken as the average height. Further, at the time of measuring the height of the insulating portion, when the elastic layer has an uneven surface, a height of the insulating layer covered on a concave portion is measured.

The insulating portion can contain a resin and be made of a resin. Examples of the resin can include at least one resin selected from the group consisting of a resin having a structural unit represented in Structural Formula (7) as a third resin and a resin having a structural unit represented in Structural Formula (8) as a fourth resin, and it is preferable that the insulating portion includes these resins. In addition, these resins (insulating resins) may have an overlapping structure or may represent the same resin.

When the insulating portion contains the above-mentioned insulating resin, the moisture absorption property of the insulating portion itself can be further suppressed, so that a difference in moisture absorption amount between the vicinity of a peripheral surface of the electrophotographic member (developing roller) exposed to the opening portion of the cartridge and the other peripheral surface portions can be further suppressed. Therefore, non-uniformity of the gradient force in the electrophotographic member can be further decreased, such that density unevenness can be further suppressed.

Hereinafter, first, among the insulating resins, the resin represented by Structural Formula (7) will be described in detail.

It is preferable that the insulating portion contains the third resin, and the third resin includes an acrylic resin or a methacrylic resin. That is, the third resin represented by the following Structural Formula (7) has a structure in which groups having two or more valences and 18 or less valences are linked by a linking group R72, and the linking group R72 is composed of only carbon atoms and hydrogen atoms, or carbon atoms, hydrogen atoms, and oxygen atoms.

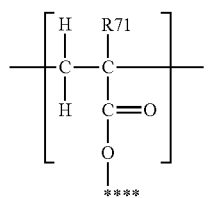

Structural Formula (7)

In Structural Formula (7), R71 represents a hydrogen atom or a methyl group, and the symbol "****" represents a binding moiety to a carbon atom in the linking group R72.

A high volume resistivity necessary for the insulating portion can be obtained by using the acrylic resin or the methacrylic resin as described above. Further, the second and third resins in the elastic layer react with each other to contribute to adhesion between the insulating portion and the elastic layer, such that at the time of using the electrophotographic member, the insulating portion is less likely to be delaminated.

Examples of the linking group R72 in Structural Formula (7) can include the following groups or structures. That is, an ethoxylated bisphenol A structure, a propoxylated bisphenol A structure, a dimethylcyclohexanediyl group, a dimethyltricyclodecanediyl group, a 2,2-dimethylpropane structure, a 2,2-dimethylpropyl ether structure, and a dendrimer structure (e.g., octadeca-valent) can be mentioned.

The structure represented by Structural Formula (7) has a three-dimensionally branched structure and can further increase a crosslinking density in the insulating portion, so that the moisture absorption property can be further suppressed. Whether the crosslinking density is large or small can be determined by measuring an elastic modulus of a cross section in the vicinity of the surface of the electrophotographic member by SPM.

By using the resin having the structural unit represented in Structural Formula (7), the volume resistivity of the insulating portion can be increased, and due to a three-dimensional structure, moisture absorption in the outer peripheral surface portion of the developing roller can be suppressed.

Here, the resin having the structural unit represented in Structural Formula (7) can be prepared using (for example, polymerizing) the following monomer.

Specific examples of the monomer can include an ethoxylated bisphenol A diacrylate monomer (R72: an ethoxylated bisphenol A structure, corresponding to a divalent one), a propoxylated bisphenol A diacrylate monomer (R72: a propoxylated bisphenol A structure, corresponding to a divalent one), a cyclohexane dimethanol di(meth)acrylate monomer (R72: a dimethylcyclohexanediyl group, corresponding to a divalent one), a tricyclodecane dimethanol di(meth)acrylate monomer (R72: dimethyl tricyclodecanediyl group, corresponding to a divalent one), a pentaerythritol triacrylate monomer (R72: 2,2-dimethyl propane structure, corresponding to a trivalent one), a pentaerythritol tetraacrylate monomer (R72: 2,2-dimethyl propane structure, corresponding to a tetravalent one), and a dipentaerythritol hexaacrylate monomer (R72: 2,2-dimethyl propyl ether structure, corresponding to a hexa-valent one). In addition, these compounds (monomers) may be used alone, and two or more thereof may be used in combination.

Further, in order to increase the volume resistivity of the insulating portion, the linking group R72 can have an aromatic structure or alicyclic structure. In order to have such a structure, a resin obtained by curing (polymerizing) a (meth)acrylate monomer or oligomer having an aromatic structure or alicyclic structure is used. Specific examples of this resin include ethoxylated bisphenol A diacrylate, tricyclodecane dimethanol diacrylate, cyclohexane dimethanol di(meth)acrylate, and polyurethane (meth)acrylate, ethoxy (meth)acrylate, or polyester (meth)acrylate having an aromatic structure or alicyclic structure.

Next, a case of using the fourth resin represented by the following Structural Formula (8) as the insulating portion will be described.

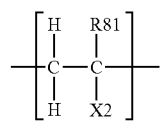

Structural Formula (8)

In Structural Formula (8), R81 represents a hydrogen atom or a methyl group, and X2 represents an atomic group having an aromatic structure.

X2 in Structural Formula (8) is not particularly limited as long as it has the aromatic structure. Examples thereof can include the following groups or structures (atomic groups). That is, a phenyl group, a 4-tert-butyl phenyl group, an n-octyl phenyl group, a tolyl group, and an atomic group having a salicylic acid structure represented by the following Structural Formula (9) can be mentioned.

Additionally, it is preferable that X2 in Structural Formula (8) includes an atomic group represented by the following Structural Formula (9).

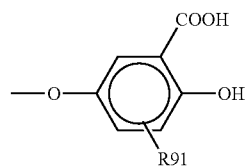

Structural Formula (9)

In Structural Formula (9), R91 represents an alkyl group having 1 to 18 carbon atoms.

In the case of using the fourth resin as the insulating portion, since the volume resistivity is further increased, the gradient force with the elastic layer is increased, such that a larger amount of toner can be conveyed.

In Structural Formula (9), examples of the alkyl group represented by R91 include linear, branched, or cyclic alkyl groups having 1 to 18 carbon atoms.

Otherwise, as a material used as the insulating portion, a resin having an aromatic or alicyclic structure can be used in view of the volume resistivity.

Among these molecules, examples of the resin having an aromatic structure or alicyclic structure can include resins having an aromatic structure such as polyethylene terephthalate, modified polyphenylene ether, polycarbonate, a styrene acrylic copolymer, and polystyrene (thermoplastic resin) and resins having an alicyclic structure such as a dimethylcyclodecanediyl group, a cyclohexanediyl group, a cyclopentadiyl group, and a cyclooctanediyl group.

(Inner Layer)

The electrophotographic member can have another layer in addition to the electroconductive substrate, the elastic layer containing the second resin, and the insulating portion as described above. For example, as illustrated in FIGS. 2A and 2B, the electrophotographic member can include the inner layer 1d between the electroconductive substrate 1a and the elastic layer 1b. The inner layer can be an elastic layer having electroconductivity. For example, the inner layer can be the same elastic layer as the elastic layer (electroconductive layer) before containing the second resin. That is, the electrophotographic member according to the present disclosure can have a single layer or a plurality of electroconductive elastic layers.

The elastic layer has electroconductivity and serves to allow the electrophotographic member to have elasticity for a contact while having a suitable area at the time of coming into contact with another member (for example, a photosensitive drum or a toner regulating member), and for decreasing stress to the toner.

A material constituting the inner layer may include a rubber (resin) material, an electroconductive agent, other additives, and the like. As the rubber material, for example, the following rubber (it may also be a resin) can be used.

Examples of the rubber can include ethylene propylene-diene copolymer rubber (EPDM), acrylonitrile butadiene rubber (NBR), chloroprene rubber (CR), natural rubber (NR), isoprene rubber (IR), styrene-butadiene rubber (SBR), fluororubber, silicone rubber, epichlorohydrin rubber, butadiene rubber (BR), hydrides of NBR, polysulfide rubber, and urethane rubber.

Particularly, it is preferable to use the silicone rubber or the epichlorohydrin rubber as the material for forming the inner layer. In addition, one of these materials may be used alone, and or two or more of these materials may be used as a mixture.

As the electroconductive agent blended in the inner layer, for example, carbon black can be used, wherein any carbon black can be used without particular limitation.

Examples of the carbon black can include acetylene black having high electroconductivity or SAF, ISAF, HAF, MAF, FEF, GPF, SRF, and the like as furnace black.

Further, in view that a volume resistivity of the electroconductive portion in the electrophotographic member is preferably $1.0 \times 10^2$ Ω·cm to $1.0 \times 10^{12}$ Ω·cm, an addition amount of carbon black in the inner layer is as follows. That is, based on a total of 100 parts by mass of the rubber material, the addition amount of carbon black is preferably 1 part by mass or more and 80 parts by mass or less, and more preferably, 2 parts by mass or more and 70 parts by mass or less.

In addition, if necessary, other electroconductive agents may be used in the inner layer together with carbon black. Examples of the other electroconductive agents can include various electroconductive metals or alloys such as graphite, aluminum, copper, tin and stainless steel, metal oxides, and various ion conductive materials obtained by performing various electroconductive processing on tin oxide, zinc oxide, indium oxide, titanium oxide, tin oxide-antimony oxide solid solution, etc. In view of allowing the volume resistivity of the electroconductive portion in the electrophotographic member to be in the above-mentioned range, an addition amount of these other electroconductive agents is preferably 2 parts by mass or more and 20 parts by mass or less, and more preferably 5 parts by mass or more and 18 parts by mass or less based on a total of 100 parts by mass of the rubber material.

Further, as other additives, additives known in an electrophotographic member field can be suitably used. Examples of the other additive can include a reinforcing agent such as hydrophilic silica, hydrophobic silica, quartz, calcium carbonate, aluminum oxide, zinc oxide, and titanium oxide and a heat transfer improving agent.

<Manufacturing Method of Electrophotographic Member>

As a manufacturing method for allowing the elastic layer to further contain an acrylic resin or methacrylic resin corresponding to the second resin in a region from the outer surface of the elastic layer containing the first resin to the depth of 1 μm, the manufacturing method has the following i) to iii) processes:

i) a process of forming a pre-elastic layer formed on the electroconductive substrate and containing an electroconductive first resin, ii) a process of impregnating a precursor of a second resin into a region from a first surface of the pre-elastic layer opposite to the side facing the substrate up to a depth of at least 1 μm from the surface of the pre-elastic layer, and curing the impregnated precursor, and iii) a process of forming the insulating portions on the first surface of the pre-elastic layer.

Further, as a manufacturing method for forming a third or fourth resin on the elastic layer containing the first resin while allowing the elastic layer to further contain an acrylic resin or methacrylic resin in a region from the outer surface of the elastic layer containing the first resin to the depth of 1 μm, the manufacturing method has the following iii) to v) processes:

(iii) a process of forming a pre-elastic layer formed on the electroconductive substrate and containing an electroconductive first resin, (iv) a process of impregnating a precursor of a second resin into a region from a first surface of the pre-elastic layer opposite to the side facing the substrate up to a depth of at least 1 μm from the surface of the pre-elastic layer, and curing the impregnated precursor, and (v) a process of forming insulating portions containing the third or fourth resin on the first surface of the pre-elastic layer.

It is preferable that the process (iv) is a process of applying a paint containing the precursor of the second resin on the first surface of the pre-elastic layer.

Further, it is preferable that the process (v) is a process of applying a paint for forming an insulating portion containing a precursor of the third resin or the fourth resin on the first surface of the pre-elastic layer.

The manufacturing method includes a process of applying a paint containing the precursor of the second resin and the precursor of the third resin or the fourth resin on the first surface of the pre-elastic layer to impregnate the precursor of the second resin into the region from the first surface of the pre-elastic layer to the depth of 1 μm; a process of allowing the precursor of the third resin or the fourth resin to be present on the first surface; and a process of polymerizing the precursor of the second resin and the precursor of the third resin with each other. As described above, it is preferable to simultaneously perform a process of impregnating the precursor (for example, an acrylic monomer) of the second resin into the region of the elastic layer containing the first resin to the depth of 1 μm from the surface and the process of allowing the precursor (for example, an acrylic monomer) of the third resin to be present on the elastic layer containing the first resin.

Further, the manufacturing method can include a process of forming another layer (for example, an inner layer) on the electroconductive substrate, a process of preparing the electroconductive substrate, or the like in addition to the above-mentioned processes.

A sequence of each process is not particularly limited, but a plurality of processes (for example, an impregnation process and an insulating portion forming process) may also be performed at the same time. For example, after forming the insulating portion on the elastic layer containing the first resin, the precursor of the second resin may be impregnated. Hereinafter, each process will be described in detail in an example of the manufacturing method of the electrophotographic member according to the present disclosure.

A molecular weight of the precursor (monomer) of the acrylic resin or methacrylic resin corresponding to the second resin is preferably 80 to 500. When the molecular weight of the compound is 80 to 500, at the time of impregnating the precursor of the acrylic resin or methacrylic resin into the elastic layer to form the elastic layer, the compound is easily impregnated.

Further, a viscosity of the precursor (monomer) of the second acrylic resin or methacrylic resin is preferably 100 cP(100 mPa·s) or less at 25° C. When the viscosity of the compound is 100 cP or less, at the time of impregnating the precursor of the second acrylic resin or methacrylic resin into the elastic layer to form an elastic layer, the compound is easily impregnated.

Further, a molecular weight of the precursor of the third resin is preferably 800 to 3000. By setting the molecular weight in this range, the third resin can be appropriately spread on the elastic layer while remaining on the elastic layer without being impregnated into the elastic layer, such that it is possible to secure an area of the insulating portion.

As a method of controlling whether to additionally impregnate the precursor or allow the precursor to remain on the elastic layer, a method of using SP values of the elastic layer and the precursor, affinity to the urethane resin corresponding to the first resin, or affinity between the precursors can be mentioned.

(Inner Layer Forming Process)

As a manufacturing method of forming an inner layer on the electroconductive substrate (shaft core body), a method known in the electrophotographic member field can be suitably used. For example, the following method can be used. That is, a method of extruding and molding the substrate and a material for forming an inner layer together can be mentioned, and when the material for forming an inner layer is a liquid, a method of injecting the material for forming an inner layer into a mold provided with a cylindrical pipe and a piece for holding the substrate provided at both ends of the pipe; and the substrate and heating and curing the material, and the like, can be mentioned. Further, as the material constituting the inner layer may include a rubber material, an electroconductive agent, other additives, and the like as described above.

(Formation of Elastic Layer)

The elastic layer including an electroconductive portion and an insulation covered portion on the electroconductive substrate (inner layer in the case in which the inner layer is present) can be manufactured, for example, by the following method.

First, an elastic layer (electroconductive layer) that does not contain the second resin is formed on the electroconductive substrate using materials (material for forming an elastic layer) except for the second resin (elastic layer forming process). Consequently, an elastic layer containing the second resin is formed by impregnating the second resin into a surface of this elastic layer (resin impregnation process). As described above, a method of forming the elastic layer can include the elastic layer forming process and the resin impregnation process.

Elastic Layer Formation Process

As a method of forming the elastic layer on the electroconductive substrate (inner layer in the case in which the inner layer is present), for example, a method of coating the substrate with a coating solution prepared by mixing and dispersing a urethane resin, carbon black, a solvent, and the like with an additive can be mentioned.

The solvent used in the coating solution can be suitably selected as long as the urethane resin is dissolved (or dispersed) in the solvent. Specific examples of the solvent are as follows: ketones represented by methyl ethyl ketone and methyl isobutyl ketone; hydrocarbons represented by hexane, toluene and the like; alcohols represented by methanol and isopropanol; esters; and water. In view of solubility and a boiling point of the resin, a particularly preferable solvent is methyl ethyl ketone or methyl isobutyl ketone.

Precursor Impregnation Process

As a method of impregnating the precursor (monomer) of the second resin into the elastic layer, for example, the following method can be used. That is, a method of applying (a resin material containing) a precursor (monomer or the like) for forming the second resin, a solvent, and (if necessary) an additive such as a polymerization initiator or the like on the elastic layer first to impregnate these material thereinto and performing polymerization by heating or irradiating with UV light as need can be used. In the case of using this method, the second resin is likely to be present in the vicinity (for example, a region from the surface of the elastic layer to the depth of 1 μm) of the surface of the elastic layer (for example, electroconductive portion), which is preferable.

The resin material may be impregnated into at least a portion which will become the electroconductive portion (a portion that will be a portion of the outer surface of the electrophotographic member) on the elastic layer. For example, the resin material may be impregnated into the entire surface of the elastic layer. In addition, although a detailed description will be provided below, a material for forming an insulating portion can be applied together with the resin material on the elastic layer to thereby be impregnated thereinto.

As a compound for forming the second resin, the above-mentioned compound can be suitably used depending on a second resin to be manufactured. As this compound, for example, a (meth)acrylic monomer, a vinyl monomer, a styrene based monomer, an allyl monomer, or a compound having 2 to 3 (meth)acryloyl groups or vinyl groups in a molecule can be used.

As the polymerization initiator, a polymerization initiator known in the art can be suitable used. Specifically, the following polymerization initiator can be used.

As a polymerization initiator in the case of polymerization by heating, for example, peroxides such as 3-hydroxy-1,1-dimethylbutyl peroxy neodecanoate, α-cumyl peroxy neodecanoate, t-butyl peroxy neoheptanoate, t-butylperoxy pivalate, t-amyl peroxy normal octoate, t-butyl peroxy 2-ethylhexyl carbonate, dicumyl peroxide, di-t-butyl peroxide, di-t-amyl peroxide, 1,1-di(t-butylperoxy) cyclohexane, and n-butyl-4, 4-di(t-butylperoxy) valerate; and azo compounds such as 2,2-azobisisobutyronitrile, 2,2-azobis(4-methoxy-2,4-dimethylvaleronitrile), 2,2-azobis(2,4-dimethylvaleronitrile), 2,2-azobis(2-methylbutyronitrile), 1, 1-azobis(cyclohexane-1-carbonitrile), 2,2-azobis[2-(2-imidazolin-2-yl) propane], 2,2-azobis[2-methyl-N-(2-hydroxyethyl) propionamide], 2,2-azobis[N-(2-propenyl)-2-methylpropionamide], 2,2-azobis(N-butyl-2-methoxypropionamide), and dimethyl-2,2-azobis(isobutyrate) can be mentioned.

As the polymerization initiator in the case of polymerization by irradiation with UV light, for example, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]-phenyl}-2-methylpropan-1-one, 2-methyl-1-[4-(methylthio)phenyl]-2-morpholinopropane-1-one, 2-benzyl-2-dimethylamino-1-(4-morpholinophenyl)-butan-1-one, 2-dimethylamino-2-(4-methylbenzyl)1-(4-morpholin-4-yl-phenyl)-butan-1-one, bis(2,4,6-trimethylbenzoyl)-phenyl phosphine oxide, and 2,4,6-trimethylbenzoyl-diphenyl phosphine oxide can be mentioned.

Among them, in the case of using 2-hydroxy-1-{4-[4-(2-hydroxy-2-methyl-propionyl)-benzyl]-phenyl}-2-methyl-propan-1-one, which has high a surface-curing property, as an initiator, since the curing of the surface easily proceeds, and the crosslinking density of the second resin is increased, moisture absorption of the elastic layer is further prevented, which is preferable.

As described above, the crosslinking density can be determined by measuring an elastic modulus of a cross section in the vicinity of the surface of the electrophotographic member by SPM.

These polymerization initiators may be used alone, or two or more thereof may be used in combination.

Further, in view of efficiently performing a reaction, a blending amount of the polymerization initiator is preferably 0.5 parts by mass or more and 20 parts by mass or less based on a total of 100 parts by mass of the compound (for example, a compound having a (meth)acryloyl group) for forming the second resin.

As a heating device or UV irradiation device, a heating device or UV irradiation device known in the art can be suitably used. As a light source for irradiating UV rays, for example, an LED lamp, a high-pressure mercury lamp, a metal halide lamp, a xenon lamp, a low-pressure mercury lamp and the like can be used. A cumulative light amount required for polymerization can be appropriately adjusted depending on the kind and addition amount of compound or polymerization initiator to be used. When the compound forming the second resin is polymerized, the second resin may be polymerized so that the second resin exists in a region from the outer surface of the elastic layer to a depth of 1 μm after the irradiation, and on the premise that the second resin is present, the compound forming the second resin may be present as an unreacted component in the elastic layer at a depth exceeding 1 μm from the outer surface of the elastic layer. The solvent used in the coating solution can be suitably selected as long as the precursor of the acrylic resin, the methacrylic resin or the like is dissolved therein. Specific examples of the solvent are as follows: ketones represented by methyl ethyl ketone and methyl isobutyl ketone; hydrocarbons represented by hexane, toluene and the like; alcohols represented by methanol and isopropanol; esters; and water. In the case of performing the curing using UV light later, a particularly preferable solvent is a low-boiling point solvent such as methyl ethyl ketone in view of sufficient drying or sufficient impregnating the resin into the elastic layer.

(Insulating Portion Forming Process)

Subsequently, the insulating portion is formed on the elastic layer containing the second resin.

A method of forming the insulating portion is not particularly limited, but for example, the following method can be used. That is, a method of applying an insulating material (before curing) containing a compound for forming the insulating portion in a dot shape on the elastic layer by screen printing or a jet dispenser, and curing (polymerizing) the compound by heat or UV irradiation as needed can be mentioned. Further, a method of curing the insulating material by heating or UV irradiation after applying the above-mentioned insulating material on the elastic layer by dipping, spraying, roll coating, etc. and intentionally repelling the insulating material on the elastic layer can be mentioned.

In addition, a method of dissolving a resin material (before curing) containing a compound for forming a second resin and the above-mentioned insulating material in a solvent, applying the resultant onto the elastic layer by a method such as spraying, dipping, roll-coating, etc. and curing the resultant by heating or UV irradiation as needed can also be used. In this method, since the resin material for forming the acrylic resin or the methacrylic resin is impregnated into the elastic layer, and the insulating material is likely to be scattered and remain on the elastic layer, it is possible to simultaneously manufacture the insulating portion; and the elastic layer containing the acrylic resin or the methacrylic resin, which is preferable. In this case, the resin material for forming the acrylic resin or the methacrylic resin may be partially contained in the insulating portion, and the insulating material may be partially impregnated into the elastic layer. In addition, at the time of forming the insulating portion, if necessary, a drying operation may be performed.

The insulating material (material for forming the insulating portion) can contain a compound (monomer or the like) for forming the insulating portion described above, a solvent, and (if necessary) an additive such as a polymerization initiator or the like.

A solid concentration (dilution concentration) of the insulating material is preferably 0.1 mass % or more and 50 mass % or less in view of exposing the elastic layer to the surface while covering the elastic layer with the insulating portion.

In the case of using a thermoplastic resin as the insulating portion, since the thermoplastic resin has a relatively large molecular weight, it is easy to spread the thermoplastic resin, such that the thermoplastic resin is formed as a film on the entire surface of the elastic layer, and thus it may be impossible to form the insulating portion. Therefore, in order to make it easy to form the insulating portion, it is preferable to make it easy to expose the surface of the elastic layer and form the insulating portion by controlling wettability of the surface of the elastic layer in advance to repel the thermoplastic resin to some extent after application of the thermoplastic resin.

In the case of using a resin including Structural Formula (8) or another insulating resin (thermoplastic resin), a number average molecular weight thereof is preferably 1,000 or more and 500000 or less. In general, since the smaller the number average molecular weight of the resin including Structural Formula (8) or another insulating resin, the easier it is for the insulating portions to gather at the time of forming the insulating portions on the elastic layer, it is easy for the insulating portion to have a bowl shape with a high height. Further, since the larger the number average molecular weight of the resin including Structural Formula (8) or another insulating resin, the easier it is for the resin to be spread on the elastic layer, it is easy for the insulating portion to have a branched shape with a low height. Therefore, by setting the number average molecular weight of the resin including Structural Formula (8) or another insulating resin in the above-mentioned range (particularly in the case of simultaneously applying the precursor of the second resin and the resin containing Structural Formula (8) or another insulating resin on the elastic layer), it is easy to form an insulating portion partially covering the elastic layer, which is preferable.

The solvent used for the coating solution can be suitably selected as long as the precursor of the acrylic resin or methacrylic resin or the resin containing Structural Formula (8) or another insulating resin is dissolved therein. Specific examples of the solvent are as follows: ketones represented by methyl ethyl ketone and methyl isobutyl ketone; hydrocarbons represented by hexane, toluene and the like; alcohols represented by methanol and isopropanol; esters; water. In the case of performing the curing using UV light later, a particularly preferable solvent is a low-boiling point solvent such as methyl ethyl ketone in view of sufficient drying or securing an area of the exposed electroconductive portion when the insulating portion is formed at the time of drying.

As a method of controlling wettability of the surface of the elastic layer, for example, a method of adding a surface modifier or the like can be used.

<Electrophotographic Apparatus and Electrophotographic Process Cartridge>

Figure 4:
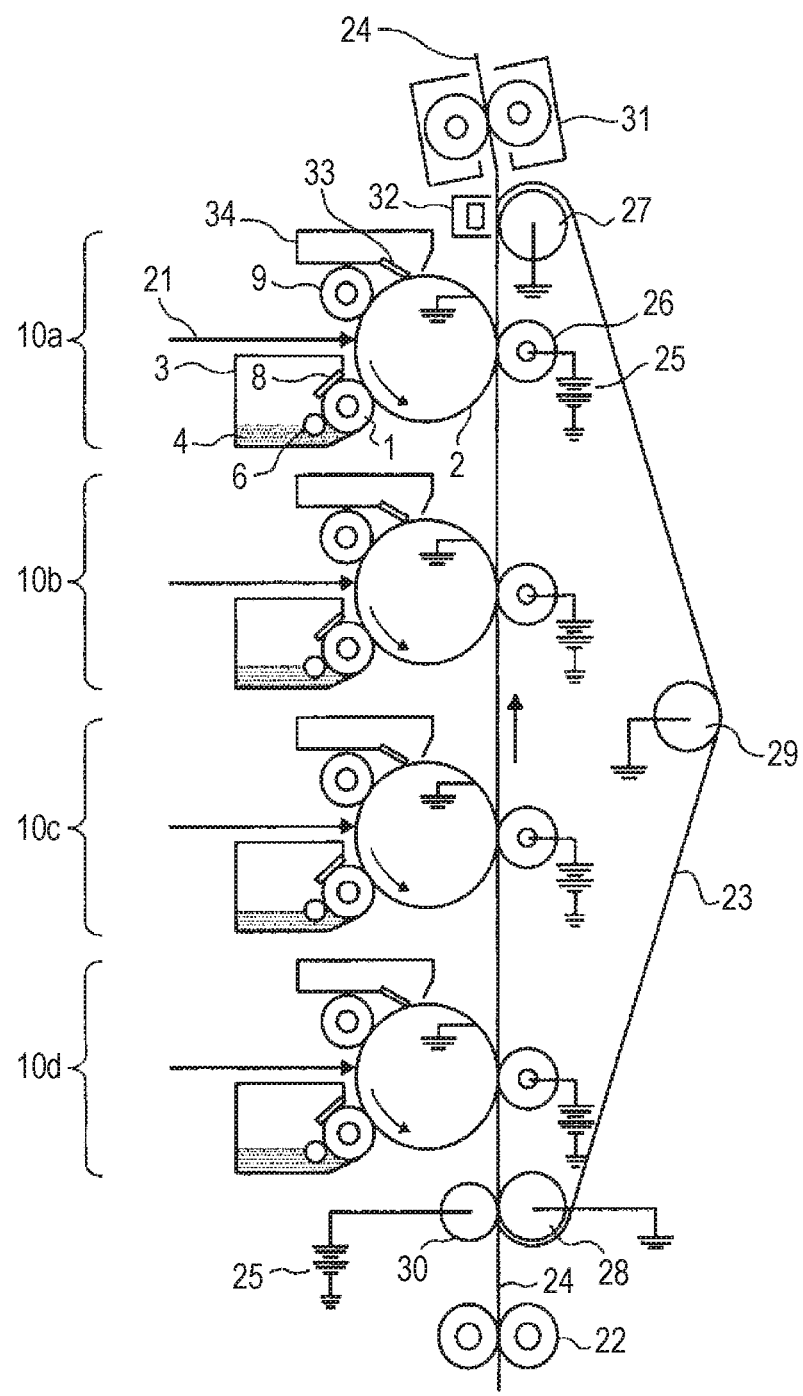
FIG. 4 is a schematic configuration view illustrating an example of an electrophotographic image forming apparatus according to the present disclosure.

A schematic configuration view of an example of an electrophotographic image forming apparatus (electrophotographic apparatus) capable of using the electrophotographic member according to the aspect of the present disclosure is illustrated in FIG. 4. This electrophotographic apparatus at least includes the following devices or the like:

an image carrier carrying an electrostatic latent image;

a charging device primarily charging the image carrier;

an exposure device forming the electrostatic latent image on the primarily charged image carrier;

a developing device developing the electrostatic latent image by a toner to form a toner image; and a transfer device transferring the toner image to a transfer member.

A detailed description thereof will be provided below.

The (color) electrophotographic apparatus illustrated in FIG. 4 has electrophotographic process cartridges 10a to 10d (for respective colors) provided in tandem for respective color toners of yellow Y, magenta M, cyan C, and black BK. These electrophotographic process cartridges can be configured to be detachably attachable to a main body of the electrophotographic apparatus, and include the electrophotographic member 1 according to the present disclosure as a developing roller. These process cartridges are the same in basic configuration, although the specifications differ slightly depending on characteristics of the color toners. The electrophotographic process cartridge according to the present disclosure can include, for example, an image carrier such as a photosensitive drum 2 or the like; a charging device having a charging member such as a charging roller 9 or the like; a developing device having a developing member such as a developing roller or the like; and a cleaning device having a cleaning member.

In the electrophotographic apparatus illustrated in FIG. 4, the photosensitive drum 2 rotates in an arrow direction, and the charging roller 9 for uniformly charging the photosensitive drum 2 is provided in the vicinity of the photosensitive drum 2. Further, in the electrophotographic apparatus, an exposure unit (exposure device) irradiating the uniformly charged photosensitive drum 2 with laser light 21 to form an electrostatic latent image, and a developing device having a developing roller, supplying a toner to the photosensitive drum 2 on which the electrostatic latent image is formed to develop the electrostatic latent image are provided. Further, a transfer device having a transfer roller 26 transferring a toner image on the photosensitive drum 2 from a back surface of a recording medium (transfer member) 24 such as paper or the like, which is supplied by a supplying roller 22 and conveyed by a conveying belt 23, onto the recording medium 24 by applying bias power 25 is provided therein. In addition, a detailed description of the developing device will be provided below.

The conveying belt 23 is suspended by a driving roller 27, a driven roller 28, and a tension roller 29 and controlled to be synchronized and moved with image forming units to convey the recording medium 24 so that the toner images formed by the respective image forming units are sequentially superimposed and transferred to the recording medium 24. Further, the recording medium 24 is electrostatically attracted to the conveying belt 23 by an operation of an attraction roller 30 provided immediately before the conveying belt 23 to thereby be conveyed.

In the electrophotographic apparatus, the photosensitive drum 2 and the developing roller, which is the electrophotographic member (electrophotographic roller) 1 according to the present disclosure are disposed into contact with each other and rotate in the same direction in contact portions between the photosensitive drum 2 and the developing roller. Further, a fixing device 31 fixing the toner image superimposed and transferred to the recording medium 24 by heating or the like and a conveying device (not illustrated) discharging the recording medium on which the image is formed to the outside of the device are provided in the electrophotographic apparatus. In addition, the recording medium 24 is detached from the conveying belt 23 to thereby be sent to the fixing device 31 by an operation of a delaminating device 32. Further, in the electrophotographic apparatus, a cleaning device having a cleaning blade 33 removing a transfer residual toner that is not transferred to the photosensitive drum 2 but remains and a waste toner container 34 accumulating a toner scraped from the photosensitive drum are provided. The cleaned photosensitive drum 2 is ready to form an image and stands by.

Figure 5:
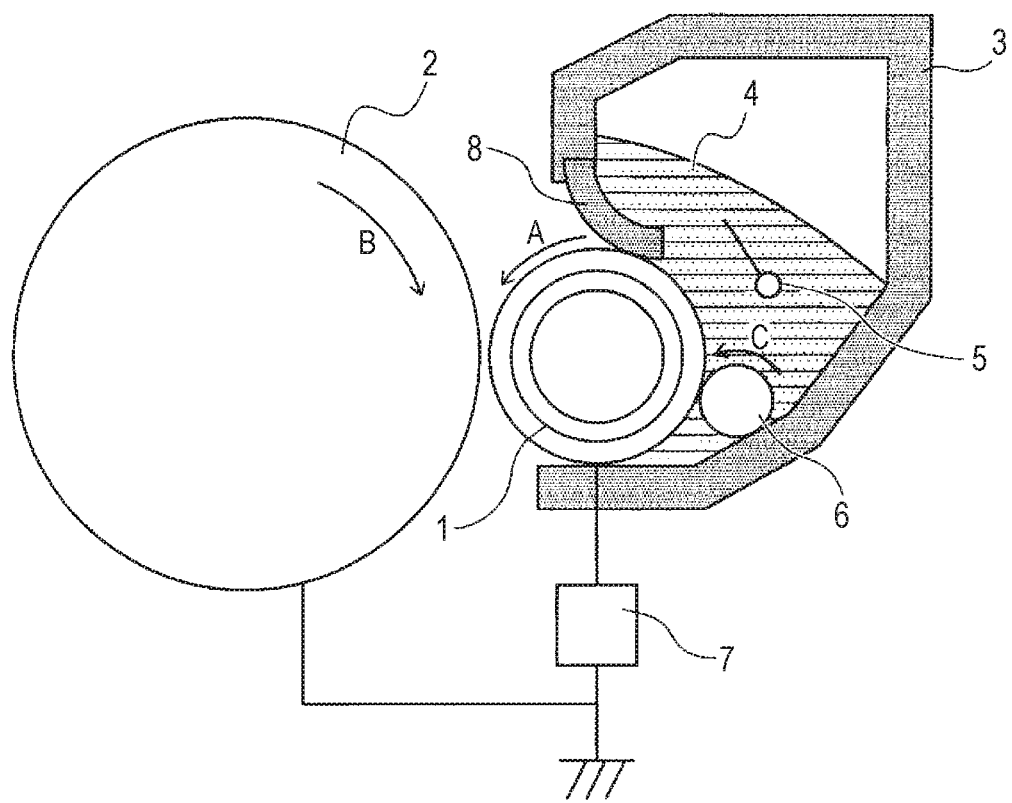
FIG. 5 is a schematic configuration view for explaining an example of a developing device according to the present disclosure.

Subsequently, an example of the developing device will be described in detail with reference to FIG. 5. In FIG. 5, the photosensitive drum 2 as an electrostatic latent image carrier carrying an electrostatic latent image formed by a known process rotates in an arrow B direction. A stirring blade 5 for stirring non-magnetic one-component toner 4 is provided in a hopper 3 corresponding to a toner container. A toner supplying/stripping member (toner supplying/stripping roller) 6 for supplying the toner 4 to the developing roller which is the electrophotographic member 1 according to the present disclosure and for stripping off the toner 4 present on the surface of the developing roller after development is in contact with the developing roller. A surface of the toner supplying/stripping roller is moved in a counter direction to the surface of the developing roller in contact portions between these two rollers by rotation of the toner supplying/stripping roller in the same direction (an arrow C direction) as the direction (an arrow A direction) of the developing roller. In this way, the non-magnetic one-component toner 4 supplied from the hopper 3 is supplied to the developing roller. A developing bias voltage is applied to the developing roller by a developing bias power supply 7 in order to move the non-magnetic one-component toner 4 carried on thereon.

It is preferable that the toner supplying/stripping member 6 is made of an elastic roller member such as a resin, rubber, sponge, or the like. The toner supplying/stripping member 6 can prevent generation of an immobile toner on the developing roller and make charging of the toner uniform by stripping off the toner that has not been developed and transferred to the photosensitive drum 2 from the surface of the developing roller.

A toner regulating member 8 disposed in the developing device works as a member regulating a layer thickness of the non-magnetic one-component toner 4 on the developing roller. The toner regulating member 8 can be made of a material having rubber elasticity such as urethane rubber, silicone rubber, or the like or a material having metal elasticity such as phosphor bronze, stainless copper, or the like. A thinner toner layer can be formed on the developing roller by pressing the toner regulating member 8 against the developing roller in such a manner that the toner regulating member 8 is warped in a direction opposite to the rotation direction of the developing roller.

According to an aspect of the present disclosure, it is possible to obtain an electrophotographic member in which density unevenness of an image is less likely to occur even in the case of outputting an image after an electrophotographic apparatus is not operated but is allowed to stand for a long period of time. According to another aspect of the present disclosure, it is possible to provide an electrophotographic process cartridge helping in stably forming a high-quality electrophotographic image. According to still another aspect of the present disclosure, it is possible to provide an electrophotographic image forming apparatus capable of stably forming a high-quality electrophotographic image.

EXAMPLE

<Manufacturing of Urethane (First Resin) Roller>

A solid shaft core body made of stainless steel (SUS304) with a diameter of 6 mm was prepared as an electroconductive substrate. A silane coupling primer (trade name: DY35-051, manufactured by Dow Corning Toray Co., Ltd.) was applied onto a peripheral surface of the shaft core body and then the shaft core body was baked at a temperature of 160° C. for 40 minutes.

Next, the shaft core body was co-axially disposed in a cylindrical mold, and a liquid material for forming an inner layer (material for forming an inner layer) in which materials illustrated in the following Table 1 were dispersed was poured in a gap between an inner peripheral surface of the mold and a peripheral surface of the shaft core body and heated at a temperature of 130° C. for 30 minutes. After cooling, the shaft core body to which the materials were attached was removed from the mold, and additionally, the shaft core body was heated in an oven heated to a temperature of 200° C. for 4 hours, thereby obtaining an elastic roller having a silicone rubber layer (inner layer) having a thickness of 3 mm on the shaft core body.

TABLE 1

| Material | Parts by mass |
|---|---|
| Silicone rubber: XE15-645 A solution (trade name, Momentive Performance Materials Japan LLC) | 50 |
| Silicone rubber: XE15-645 B solution (trade name, Momentive Performance Materials Japan LLC) | 50 |
| Carbon black: DENKA BLACK(powder) (trade name, Denka Company Limited) | 7 |

Next, an elastic layer was provided on a peripheral surface of the silicone rubber layer (inner layer) of the elastic roller as follows. That is, a mixture obtained by weighing respective materials shown in Table 2 and adding methyl ethyl ketone (MEK) thereto to well-disperse these materials was put into an overflow type circulation coating device. The elastic roller was immersed in the coating device and picked up, followed by air-drying for 40 minutes and heating at 150° C. for 4 hours, thereby manufacturing a urethane roller on which an electroconductive elastic layer having a thickness of 20 μm was provided.

TABLE 2

| Material | Parts by mass |
|---|---|
| Polyol: PTG L2000 (trade name, prepared by HODOGAYA CHEMICAL CO., LTD.) | 75 |
| Isocyanate: L-55E (trade name, prepared by Nippon Polyurethane Industry Co., Ltd.) | 25 |
| Carbon black: MA100 (trade name, prepared by Mitsubishi Chemical Corporation) | 23 |
| Urethane particles: C600 transparent (trade name, prepared Negami Chemical Industrial Co., Ltd) | 20 |

Example 1

A mixture (a second resin and a material for forming an insulating portion) obtained by dispersing materials shown in Table 3 in MEK was applied on an outer peripheral surface of the urethane roller. Thus, the following impregnation component was impregnated into the elastic layer to form an elastic layer, and insulating portions were formed on the elastic layer at the same time.

TABLE 3

| Material | Parts by mass |
|---|---|
| Acrylic compound (impregnation component: compound for forming second resin): PO-modified neopentyl glycol diacrylate (Structural Formula (10)) (trade name: EBECRY145, prepared by DAICEL-ALLNEX Ltd.) | 100 |
| Acrylic compound (insulating portion: compound for forming insulating resin) dipentaerythritol hexaacrylate (Structural Formula (A)) (trade name: A-DPH, prepared by Shin-Nakamura Chemical Co., Ltd.) | 20 |
| Polymerization initiator: 1-hydroxy-cyclohexyl phenyl ketone (polymerization initiator: ERGACURE184, prepared by BASF) | 8 |

Structural Formula (10)

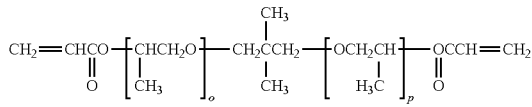

(In Formula (10), o + p is 2).
Structural Formula (A)

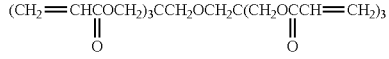

Specifically, a mixture obtained by weighing respective materials shown in Table 3, adding MEK thereto so that a concentration of an insulating component (compound for forming an insulating resin) was 2 mass %, and well-dissolving these materials was put into an overflow type circulation coating device. The urethane roller was immersed in the coating device and picked up, followed by air-drying for 40 minutes and heating at 90° C. for 1 hour.

Here, the insulating portions were applied on the elastic layer in a state in which the insulating portion was repelled thereon. Thereafter, the insulating portions were formed by curing the impregnation components and the insulating component by irradiating, with UV light, an outer surface of the urethane roller to which the mixture was attached so that a cumulative light amount would be 2000 mJ/cm². In this way, an electrophotographic roller according to the present Example was manufactured. Further, as a UV irradiation device, a high-pressure mercury lamp (trade name: handy type UV curing device, manufactured by Mario network Co., Ltd.) was used.

(Observation of Outer Surface of Developing Roller)

An example of observation of an outer surface of the developing roller is shown below.

First, the outer surface of the developing roller was observed using an optical microscope (VHX5000 (product name), manufactured by Keyence Corp.), and it was confirmed that two or more regions composed of electroconductive and insulating portions were present on the outer surface. Next, a thin piece including the outer surface of the developing roller was cut out from the developing roller using a cryomicrotome (UC-6 (product name), manufactured by Leica Microsystems). The thin piece was cut out at a temperature of −150° C. so as to include two or more regions having a thickness of 1 μm on the outer surface of the developing roller based on a size of 100 μm×100 μm of the outer surface of the developing roller. Next, the outer surface of the developing roller on the cut thin piece was observed using the optical microscope.

(Measurement of Residual Potential Distribution)

The residual potential distribution was obtained by corona-charging the outer surface of the developing roller on the thin piece with a corona discharging device and measuring a residual potential of the outer surface with an electrostatic force microscope (MODEL 1100TN, manufactured by Trek Japan Co., Ltd.) while scanning the thin piece.

First, the thin piece was placed on a smooth and flat silicon wafer so that a surface including the outer surface of the developing roller was an upper surface) and allowed to stand in an environment of a temperature of 23° C. and a relative humidity of 50% for 24 hours. Then, the silicon wafer on which the thin piece was placed was placed on a high-precision XY stage embedded in the electrostatic force microscope in the same environment. As the corona discharging device, a corona discharging device in which a distance between a wire and a grid electrode was 8 mm was used. The corona discharging device was disposed at a position at which a distance between the grid electrode and a surface of the silicon wafer was 2 mm. Next, the silicon wafer was grounded, and a voltage of −5 kV was applied to the wire and a voltage of −0.5 kV was applied to the grid electrode using an external power supply. After the start of application, the outer surface of the developing roller on the thin piece was corona-charged by scanning at a speed of 20 mm/s parallel to the surface of the silicon wafer so that the thin piece passed right below the corona discharging device using the high-precision XY stage.

Subsequently, the thin piece was moved right below a cantilever of the electrostatic force microscope using the high-precision XY stage. Subsequently, the residual potential distribution was measured by measuring a residual potential of the outer surface of the developing roller corona-charged while being scanned using a high-precision XY stage. Measurement conditions were shown below:

Measurement environment: temperature of 23° C., relative humidity of 50%

Time consumed to measurement initiation after a measurement point passed right below the corona discharging device: 1 min;

Cantilever: Cantilever for Model 1100 TN (model number: Model 1100 TNC-N, manufactured by Trek Japan Ltd.);

Gap between measurement surface and cantilever tip: 10 μm;

Measurement range: 99 μm×99 μm; and

Measurement interval: 3 μm×3 μm.

It was confirmed whether each region was an insulating portion having an electrical insulation property or an electroconductive portion having higher electroconductivity than that of the insulating portion by confirming the presence or absence of residual potential in two or more regions present on the thin piece from the residual potential distribution obtained by the measurement. In detail, among two or more regions, a region including a portion of which an absolute value of the residual potential was less than 1 V was confirmed as the electroconductive portion, and a region including a portion of which an absolute value of the residual potential was 1 V or more with respect to the absolute value of the residual potential of the electroconductive portion was confirmed as the insulating portion.

(Measurement of Time Constant of Residual Potential)

A time constant was obtained by corona-charging the outer surface of the developing roller using a corona discharging device and measuring a time-dependent change in the residual potential on the electrical insulating portion or the electroconductive layer present on the outer surface using an electrostatic force microscope (MODEL 1100TN, manufactured by Trek Japan Ltd.), followed by fitting to Calculation Equation (1). Here, a measurement point of the electrical insulating portion was a point at which the absolute value of the residual potential was the largest in the insulating portion confirmed by the measurement of the residual potential distribution. Further, a measurement point of the electroconductive layer was a point at which the residual potential was approximately 0 V in the electroconductive portion confirmed by the measurement of the residual potential.

First, the thin piece was placed on a smooth and flat silicon wafer so that a surface including the outer surface of the developing roller was an upper surface and allowed to stand in an environment of a room temperature of 23° C. and a relative humidity of 50% for 24 hours.

Then, the silicon wafer on which the thin piece was placed was placed on a high-precision XY stage embedded in the electrostatic force microscope in the same environment. As the corona discharging device, a corona discharging device in which a distance between a wire and a grid electrode was 8 mm was used. The corona discharging device was disposed at a position at which a distance between the grid electrode and a surface of the silicon wafer was 2 mm. Next, the silicon wafer was grounded, and a voltage of −5 kV was applied to the wire and a voltage of −0.5 kV was applied to the grid electrode using an external power supply. After the start of application, the thin piece was corona-charged by scanning at a speed of 20 mm/s parallel to the surface of the silicon wafer so that the thin piece passed right below the corona discharging device using the high-precision XY stage.

Subsequently, a time-dependent change of the residual potential was measured by moving a measurement point of the electrical insulating portion or the electroconductive layer right below the cantilever of the electrostatic force microscope using the high-precision XY stage. The electrostatic force microscope was used in measurement. Measurement conditions were shown below:

Measurement environment: temperature of 23° C., relative humidity of 50%;

Time consumed to measurement initiation after a measurement point passed right below the corona discharging device: 15 sec;

Cantilever: Cantilever for Model 1100 TN (model number: Model 1100 TNC-N, manufactured by Trek Japan Ltd.);

Gap between measurement surface and cantilever tip: 10 μm;

Measurement frequency: 6.25 Hz; and

Measurement time: 1000 sec.

From the time-dependent change of the residual potential obtained by the measurement, the time constant τ was determined by fitting the following Equation (1) by a least square estimation method.

$$V0=V(t)x\ \exp(-t/\tau)\qquad \text{Calculation Equation (1)}$$

In Calculation Equation (1), t, V0, V(t), and τ are defined as follows.

t: elapsed time (seconds) after the measurement point passed right below the corona discharging device;

V0: initial potential (V) (potential at t=0 seconds);

V(t): residual potential (V) at t seconds after the measurement point passed right below the corona discharging device;

τ: time constant (seconds) of residual potential.

The time constant τ of the residual potential was measured at a total of 9 points at 3 points in a longitudinal direction×3 points in a circumferential direction of the outer surface of the developing roller, and an average value thereof was determined as the time constant of the residual potential of the electrical insulating portion or the electroconductive layer according to the present disclosure, such that it was confirmed that the time constants of the electrical insulating portion and the electroconductive layer were 1.0 min or more and 0.1 min or less, respectively.

Next, an insulating portion of another electrophotographic roller was partially stripped off. In addition, an outer surface of the electrophotographic roller including the stripped portion was analyzed with a microscopic IR (trade name: Fully automated microscopic FT-IR system: LUMOS, manufactured by Bruker Optics). As a result, the presence of a urethane resin and a second resin, a cured product (polymer) of a compound represented by Formula (10), on surfaces of both a portion (insulation covered portion) from which the insulating portion was stripped off, and a portion (electroconductive portion) that was not covered with the insulating portion in the surface of the elastic layer was confirmed. Further, the insulating portion was similarly analyzed by the microscopic IR (trade name: Fully automated microscopic FT-IR system: LUMOS, manufactured by Bruker Optics), and as a result, the presence of the cured product of Formula (A) was confirmed.

Subsequently, after the surface of the electrophotographic roller (specifically, the elastic layer) from which the insulating portion has been partially stripped off was polished by 1 μm using a rubber roll mirror surface processing machine (trade name: SZC, manufactured by Mizuguchi Manufacturing Co., Ltd.), an operation of performing the measurement using a microscopic IR in the same manner was repeated.

In addition, since uneven portions were present on the surface of the elastic layer, at the time of initially polishing the surface using the rubber roll mirror surface processing machine, the surface was polished by 1 μm from a concave portion. As a result, it was confirmed that the resin formed from the compound of Formula (10) was not contained at a position of a depth of 3 μm from the surface of the elastic layer. Therefore, in the electrophotographic roller according to Example 1, it was confirmed that the resin formed from the compound of Formula (10) was contained from a position of the surface of the elastic layer including the electroconductive portion and the insulation covered portion to a position of a depth of 2 μm.

In Table 10, a case in which the second resin was contained and a case in which the second resin was not contained in a region from the position of the surface to a position of a depth of at least 1 μm in the electroconductive portion and the insulation covered portion (a portion below the insulating portion) of the elastic layer were represented as "Y" and "N", respectively.

Next, a rubber piece of another electrophotographic roller was cut out, and an elastic modulus of a portion in a range from a surface to a depth of 1 μm (a portion including the resin formed from the compound of Formula (10) described above) using SPM (trade name: MFP-3D-Origin, manufactured by Oxford Instruments) was measured. Further, elastic modulus of a portion in a range from the surface to 3 to 4 μm (a portion made of only the urethane resin without containing the resin formed from the compound of Formula (10)) and the above-mentioned urethane resin particles was measured. That is, a rubber thin piece having a thickness of 200 nm and a size of 100 μm x 100 μm and including a cross section was cut from the electrophotographic roller at −150° C. using a cryomicrotome (UC-6 (product name), manufactured by Leica Microsystems), placed on a smooth and flat silicon wafer, and allowed to stand in an environment of room temperature of 25° C. and a humidity of 50% for 24 hours.

Next, the silicon wafer on which the rubber thin piece was placed was set on an SPM stage, and a cross section of the electrophotographic roller was scanned using a probe (trade name: AC160, manufactured by Olympus Corp.) as a condition related to the probe: spring constant: 28.23 nN/nm, impulse constant: 82.59 nm/V, resonance frequency: 282 KHz (first order), and 1.59 MHz (high order).

In addition, as conditions other than the probe, the following conditions were used. That is, scanning was performed under conditions in which a measurement mode of SPM was an AM-FM mode, a free amplitude of the probe was 3 V, a set point amplitude was 2 V (first order) and 25 mV (high order), a scanning speed was 1 Hz in a size of 5 μm x 5 μm (field of view), and the number of scan points was 256 (vertical) and 256 (horizontal). Thereafter, 20 measurement points in the portion in the range from the surface to the depth of 1 μm and 20 measurement points in a portion in a range from the surface to a depth of 3 to 4 μm were designated, and a force curve in each measurement point was obtained in a contact mode. In addition, conditions at the time of obtaining the force curve were as follows. The force curve was obtained under the conditions in which a trigger value was 0.2 to 0.5 V (changed depending on a hardness), a distance of 500 nm at which the force curve was measured, and the scanning speed of 1 Hz (the speed at which the probe reciprocated once). Thereafter, fitting based on Hertz theory was performed on each force curve. The obtained result was taken as an elastic modulus of each measurement point.

An elastic modulus of the portion in the range from the surface to the depth of 1 μm was 4.1 GPa, an elastic modulus of the portion in the range from the surface to a depth of 3 to 4 μm was 44.1 MPa, and an elastic modulus of the urethane resin particles was 13.4 MPa.

(Evaluation as Developing Roller)

I) Evaluation of Image Density Difference

Next, the electrophotographic roller according to Example 1 was mounted in a modified process cartridge for a color laser printer (trade name: CLJ4525, manufactured by Hewlett-Packard Company) as a developing roller. In addition, as the modified process cartridge, a process cartridge from which a toner supplying/stripping member was removed in advance was used. The process cartridge was mounted in the color laser printer and allowed to stand in an environment of a temperature of 40° C. and a relative humidity of 95% for 3 days. In addition, marking was performed on the development roller so as to confirm which portion of the development roller was an outer peripheral surface exposed to the opening portion of the cartridge. Next, after the process cartridge was additionally allowed to stand in an environment of a temperature of 23° C. and a relative humidity of 50% for 24 hours, a solid image was output using this color laser printer. It was confirmed that a marking mark on the developing roller was output on the solid image, and at the time of standing in the environment of a temperature of 40° C. and a relative humidity of 95% for 3 days, an image density of the portion positioned in the opening portion of the cartridge was low as compared to the other portions.

Then, an image density of the obtained solid image was measured using a spectrodensitometer: X-Rite 504 (trade name, S.D.G. K.K.), and an image density difference was obtained by subtracting an average value of measurement values at 15 points in a portion where the image density was low from an average value of measurement values at 15 points in a portion where the image density was high. Further, in the solid image, in order to select the portions where the image density was high and low, an operation to respectively select 5 points where the image density was high and low by visual observation within one round of development roller was performed for 3 rounds of the developing roller, such that a total of 15 points were selected. Here, these 15 points were selected so that positions thereof in a longitudinal direction of the developing roller did not overlap each other. Further, evaluation was performed based on the following evaluation criteria. Evaluation results are shown in Tables 16 to 18 described below.

Evaluation Criteria

Rank A: the image density difference was 0.10 or less.
Rank B: the image density difference greater than 0.10 and 0.15 or less.
Rank C: the image density difference was greater than 0.15 and 0.20 or less.
Rank D: the image density difference was greater than 0.20 and 0.25 or less.
Rank E: the image density difference was greater than 0.25 and 0.30 or less.
Rank F: the image density difference was greater than 0.30.

II) Evaluation of Toner Conveyance Amount Difference

Figure 6:
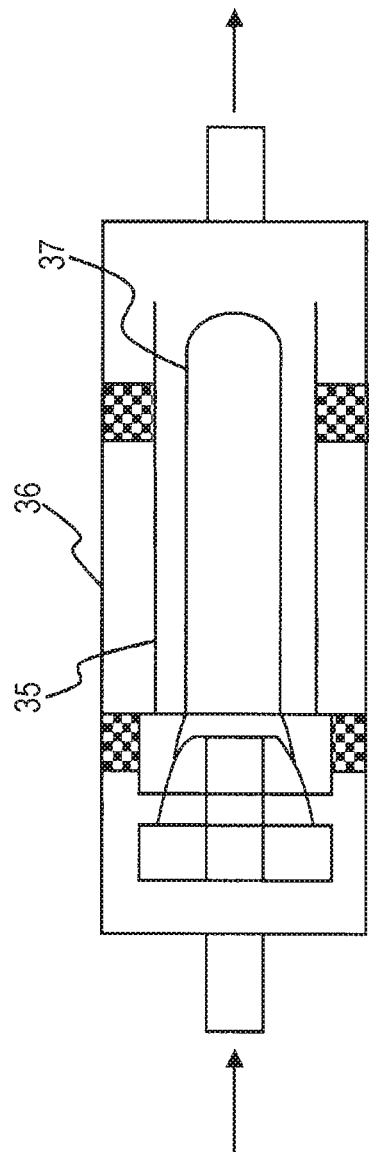
FIG. 6 is a schematic configuration view of a jig used at the time of measuring a toner conveyance amount.

At the time of outputting a solid image using the color laser printer under the same conditions as those in evaluation of the image density difference, the color laser printer was turned off, and the process cartridge was taken out. Next, a jig composed of an outer cylinder 36, an inner cylinder 35, and a cylindrical filter paper 37 (trade name: cylindrical filter paper No. 86R, manufactured by Advantec Co., Ltd.) as illustrated in FIG. 6 was provided in a cleaner, and a toner on the developing roller mounted in the process cartridge was sucked into the cylindrical filter paper. Further, the cleaner was provided in a right direction of the paper surface of FIG. 6, and the toner was sucked in a left direction of the paper surface. In addition, a mass of the suck toner was measured, and a toner amount per unit area on the developing roller was determined as a toner conveyance amount (mg/cm$^2$).

Further, marking was performed on the development roller so as to confirm which portion of the development roller was an outer peripheral surface exposed to the opening portion of the cartridge. Toner conveyance amounts of portions of the developing roller corresponding to both a portion positioned in the opening portion of the cartridge and a portion positioned in a non-opening portion of the cartridge based on this marking position were measured, respectively, and a toner conveyance amount difference was obtained by subtracting the toner conveyance amount of the portion positioned in the opening portion from the toner conveyance amount of the portion positioned in the non-opening portion. The results are shown in Table 16 described below.

III) Evaluation of Surface Potential Difference

After outputting a solid image using the color laser printer under the same conditions as those in evaluation of the image density difference, the developing roller was taken out from the process cartridge. In addition, after removing the attached toner from the developing roller by air-blowing, surface potentials were measured at respective points obtained by dividing the developing roller into 260 portions in a longitudinal direction and into 18 portions in a circumferential direction.

Further, a surface potential of a portion of the developing roller corresponding to the opening portion of the cartridge was lower than that of a portion of the developing roller corresponding to the non-opening portion thereof. Next, regarding the surface potential corresponding to the point at which the image density of the solid image was measured, a surface potential difference (unit: V) was obtained by subtracting an average value of surface potentials of 15 points where the image density was low (portions of the developing roller corresponding to the non-opening portion of the cartridge) from an average value of surface potentials of 15 points where the image density was high (portions of the developing roller corresponding to the opening portion of the cartridge). The results are shown in Tables 16 to 18. In addition, a dielectric relaxation analysis system of a semi-insulator device manufactured by Quality Engineering Associates was used as a measuring device of the surface potential. Since the higher the volume resistivity of the insulating portion, the higher the surface potential, to obtain the surface potential difference on the developing roller is a standard for knowing the volume resistivity at each place of the developing roller.

Examples 2 and 3

Electrophotographic rollers were manufactured in the same manner as in Example 1 except that a PO-modified neopentyl glycol diacrylate was changed to the following compounds as an impregnation component. Specifically, in Example 2, trimethylol propane triacrylate (the following Structural Formula (B)) (trade name: TMPA, prepared by Shin-nakamura chemical Co., Ltd.) was used, and in Example 3, neopentyl glycol dimethacrylate (the following Structural Formula (C)) (trade name: NPG, prepared by Shin-nakamura chemical Co., Ltd.) was used.

Structural Formula (B)

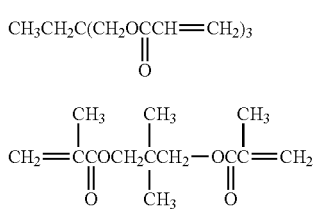

Structural Formula (C)

CH$_2$=CCOCH$_2$CCH$_2$—OCC=CH$_2$ (with CH$_3$ groups and carbonyls as depicted)

Example 4

A compound (trade name: A-BPP3, prepared by Shin-nakamura chemical Co., Ltd.) represented by the following Structural Formula (11) was used instead of dipentaerythritol hexaacrylate as the insulation component in Example 3. An electrophotographic roller was manufactured in the same manner as in Example 3 except for the above-mentioned difference.

Structural Formula (11)

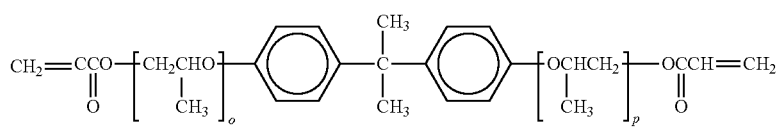

(In Structural Formula (11), o+p is 3).

Example 5

Materials shown in Table 4 were impregnated onto an outer peripheral surface of the above-mentioned urethane roller.

TABLE 4

| Material | Parts by mass |
| --- | --- |
| Styrene monomer (impregnation component: compound for forming second resin): 4-tert-butyl styrene (prepared by Tokyo Chemical Industry Co., Ltd.) | 100 |
| Polymerization Initiator: tert-butyl-peroxy-2-ethylhexyl monocarbonate (polymerization initiator: Perbutyl E, prepared by NOF CORPORATION) | 5 |

Specifically, a mixture (material for forming a second resin) obtained by weighing respective materials shown in Table 4 and adding MEK thereto to well-dissolve these materials was placed into an overflow type circulation coating device. After immersing the urethane roller in the coating device to impregnate the impregnation component into the elastic layer and picking the urethane roller up, air-drying was performed thereon for 40 minutes, followed by heating at 120° C. for 2 hours to cure the impregnation component, thereby forming an elastic layer. In addition, insulating portions were formed on this elastic layer using materials shown in Table 5.

TABLE 5

| Material | Parts by mass |
| --- | --- |
| Acrylic compound (insulating portion: compound for forming insulating resin) dipentaerythritol hexaacrylate (Structural Formula (A)) (trade name: A-DPH, prepared by Shin-Nakamura Chemical Co., Ltd.) | 100 |
| Polymerization initiator: 1-hydorxy-cyclohexyl phenyl ketone (polymerization initiator: ERGACURE184, prepared by BASF) | 5 |

Specifically, a mixture (material for forming an insulating portion) obtained by weighing respective materials shown in Table 5 and adding MEK thereto to well-dissolve these materials was placed into an overflow type circulation coating device. The roller on which the elastic layer was formed was immersed in the coating device and picked up, followed by air-drying for 40 minutes and heating at 90° C. for 1 hour. Thereafter, an electrophotographic roller in which the insulating portions were formed was obtained by curing the insulating portion by irradiating, with UV light, a surface of the roller to which the mixture was attached so that a cumulative light amount would be 2000 mJ/cm$^2$. Further, as a UV irradiation device, a high-pressure mercury lamp (trade name: handy type UV curing device, manufactured by Mario network Co., Ltd.) was used.

Example 6

The following impregnation component (a compound for forming a second resin) was impregnated into the elastic layer on the outer peripheral surface of the urethane roller described above using materials illustrated in the following Table 6, thereby forming insulating portions on an elastic layer while forming the elastic layer.

TABLE 6

| Material | Parts by mass |
| --- | --- |
| Acrylic monomer (impregnation component: compound for forming second resin): allyl phenyl ether (prepared by Tokyo Chemical Industry Co., Ltd.) | 100 |
| Acrylic compound (insulating portion: compound for forming insulating resin) dipentaerythritol hexaacrylate (Structural Formula (A)) (trade name: A-DPH, prepared by Shin-Nakamura Chemical Co., Ltd.) | 20 |
| Polymerization initiator: tert-butyl-peroxy-2-ethyl hexyl monocarbonate (polymerization initiator: Perbutyl E, prepared by NOF CORPORATION) | 6 |

Specifically, a mixture (material for forming a second resin and an insulating portion) obtained by weighing respective materials shown in Table 6 and adding MEK thereto to well-dissolve these materials was placed into an overflow type circulation coating device. The urethane roller was immersed in the coating device and picked up, followed by air-drying for 40 minutes and heating at 120° C. for 2 hours, thereby curing the insulating portions and the impregnation component. In this way, an electrophotographic roller in which the insulation portions were formed was obtained.

Example 7

An electrophotographic roller was manufactured in the same manner as in Example 5 except that vinyl benzoate (prepared by Tokyo Chemical Industry Co., Ltd.) was used instead of 4-tert-butyl styrene as an impregnation component.

Examples 8 and 9

In Examples 8 and 9, electrophotographic rollers were manufactured in the same manner as in Examples 1 and 2, respectively, except that polyethylene terephthalate (trade name: vylon 200, prepared by TOYOBO Co., Ltd.) was used instead of pentaerythritol hexaacrylate as an insulating component.

Example 10

As an impregnation component, 4-tert-butyl styrene (prepared by Tokyo Chemical Industry Co., Ltd.) was used instead of allyl phenyl ether in Example 6. Further, as an insulating component, polyethylene terephthalate (trade name: vylon 200, prepared by TOYOBO Co., Ltd.) was used instead of dipentaerythritol hexaacrylate. An electrophotographic roller was manufactured in the same manner as in Example 6 except for the above-mentioned differences.

Example 11

An electrophotographic roller was manufactured in the same manner as in Example 1 except that a styrene-salicylic acid copolymer (polystyrene having a salicylic acid structure) synthesized by the following method was used instead of dipentaerythritol hexaacrylate as an insulating component.

(Synthesis of Styrene-Salicylic Acid Copolymer)

First, 100 g of 2,5-dihydroxybenzoic acid and 1441 g of 80 mass % sulfuric acid were heated and mixed with each other at 50° C. To this mixed solution, 144 g of tert-butyl alcohol was added and stirred at 50° C. for 30 minutes. Thereafter, an operation of adding 144 g of tert-butyl alcohol to this mixed solution and stirring the mixed solution for 30 minutes was additionally performed three times, thereby performing a reaction. The obtained reaction solution was cooled to room temperature (22° C.), and the cooled reaction solution was slowly poured into 1 kg of ice water. The precipitate was filtered, washed with water, and then washed with hexane. This precipitate was dissolved in 200 mL of methanol, and re-precipitated in 3.6 L of water. After filtration, the resultant was dried at 80° C., thereby obtaining 74.9 g of a salicylic acid intermediate represented by the following Structural Formula (D).

Structural Formula (D)

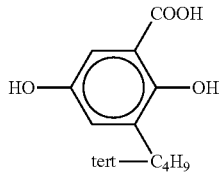

After dissolving 25.0 g of the obtained salicylic acid intermediate in 150 mL of methanol, 36.9 g of potassium carbonate was added thereto, and the mixed solution was heated to 65° C. Into this mixed solution, a mixed solution of 18.7 g of 4-(chloromethyl)styrene and 100 mL methanol was added dropwise, and a reaction was carried out at 65° C. for 3 hours. The obtained reaction solution was cooled and filtered, and the filtrate was concentrated, thereby obtaining a crude product. The crude product was dispersed in 1.5 L of water (pH 2) and extracted by adding ethyl acetate thereto. Thereafter, the resultant was washed with water, dried over magnesium sulfate, and ethyl acetate was distilled off under reduced pressure, thereby obtaining a precipitate. The precipitate was washed with hexane and purified by recrystallization with toluene and ethyl acetate, thereby obtaining 20.1 g of a vinyl monomer represented by the following Structural Formula (E).

Structural Formula (E)

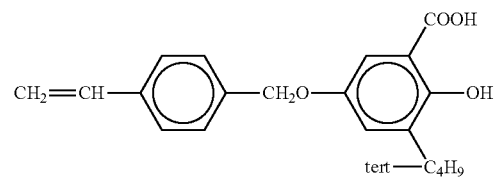

After dissolving and stirring 9.91 g of the vinyl monomer represented by Structural Formula (E) and 60.1 g of styrene in 42.0 ml of toluene, the mixed solution was stirred for 1 hour and then heated to 110° C. Into this mixed solution, a mixed solution of 4.62 g of tert-butylperoxyisopropyl monocarbonate (trade name: Perbutyl I, prepared by NOF Corp.) and 42 ml of toluene was added dropwise, and a reaction was additionally performed at 110° C. for 4 hours. Thereafter, the reaction solution was cooled, and added dropwise to 1 L of methanol, thereby obtaining a precipitate. After the obtained precipitate was dissolved in 120 ml of THF and added dropwise to 1.80 L of methanol, a white precipitate was precipitated, filtered, and dried at 90° C. under reduced pressure, thereby obtaining 57.6 g of a styrene-salicylic acid copolymer (weight average molecular weight (Mw): 10500).

Example 12

An electrophotographic roller was manufactured in the same manner as in Example 2 except that the styrene-salicylic acid copolymer was used instead of dipentaerythritol hexaacrylate as an insulating component.

Example 13

An electrophotographic roller was manufactured in the same manner as in Example 10 except that the styrene-salicylic acid copolymer was used instead of polyethylene terephthalate as an insulating component.

Examples 14 and 15

Electrophotographic rollers were manufactured in the same manner as in Example 1 except that dipentaerythritol hexaacrylate was changed to the following compounds as an insulating component. Specifically, in Example 14, a styrene acrylic copolymer (trade name: Hyaloids HA1470, prepared by Hitachi Chemical Co., Ltd.) having a structure represented by the following Structural Formula (F) was used. Further, in Example 15, an aromatic-containing polyester acrylate (trade name: Alone M7300K, prepared by Toagosei Co., Ltd.) having a polyester structure represented by the following Structural Formula (G) was used.

was used. Then, a material illustrated in the following Table 7 was impregnated into an elastic layer of this urethane roller.

TABLE 7

| Material | Parts by mass |
|---|---|
| Acrylic compound (impregnation component: compound for forming second resin): PO-modified neopentyl glycol diacrylate (Structural Formula (10)) (General Formula (9)) (trade name: EBECRY145, prepared by DAICEL-ALLNEX LTD.) | 100 |
| Polymerization initiator: 1-hydroxy-cyclohexyl phenyl ketone (polymerization initiator: ERGACURE184, prepared by BASF) | 5 |

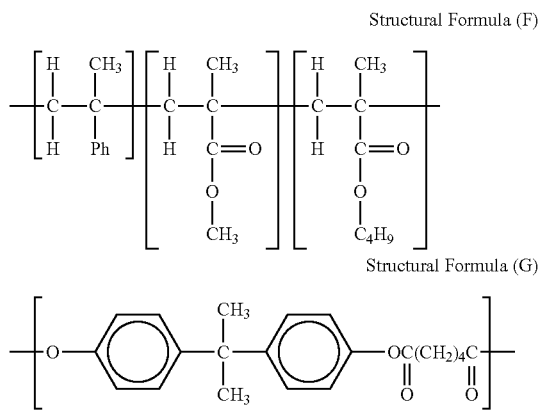

Structural Formula (F)

Structural Formula (G)

Specifically, a mixture (material for forming a second resin) obtained by weighing respective materials shown in Table 7 and adding MEK thereto to dissolve these materials was placed into an overflow type circulation coating device. The urethane roller on which the insulating portions were formed was immersed in the coating device and picked up, followed by air-drying for 40 minutes and heating at 90° C. for 1 hour. Thereafter, an electrophotographic roller in which the elastic layer was formed and the insulating portions were formed on the elastic layer was obtained by curing the impregnation component by irradiating, with UV light, a surface of the roller to which the mixture was attached so that a cumulative light amount would be 2000 mJ/cm². Further, as a UV irradiation device, a high-pressure mercury lamp (trade name: handy type UV curing device, manufactured by Mario network Co., Ltd.) was used.

Further, in the electrophotographic roller obtained in Example 21, the presence of a urethane resin and a cured product (second resin) of the impregnation component (acrylic compound) was confirmed in an electroconductive portion of the elastic layer, but it was impossible to confirm the presence of the second resin in an insulation covered portion.

Examples 16 and 17

In Examples 16 and 17, aromatic-containing polyester acrylate (trade name: Alone M7300K, prepared by Toagosei Co., Ltd.) was used instead of dipentaerythritol hexaacrylate as an insulating component in Examples 2 and 5, respectively. Electrophotographic rollers in Examples 16 and 17 were manufactured in the same manner as in Examples 2 and 5 except for the above-mentioned difference.

Examples 18 to 20

In Examples 18 to 20, electrophotographic rollers were manufactured in the same manner as in Example 1 except that the following compounds were used instead of dipentaerythritol hexaacrylate as an insulating component, respectively. Specifically, polystyrene (prepared by Sanplatec Co., Ltd.) was used in Example 18, polycarbonate (prepared by Sanplatec Co., Ltd.) was used in Example 19, and polyarylate (U Polymer (registered trademark), prepared by Unitika, Ltd.) was used in Example 20.

Example 21

Insulating portions were formed on an elastic layer by applying a mixture (material for forming an insulating portion) obtained by dispersing a material illustrated in the above-mentioned Table 5 in MEK on an outer peripheral surface of the above-mentioned urethane roller. Specifically, a mixture obtained by weighing respective materials shown in Table 5 and adding MEK thereto to well-disperse these materials was placed into an overflow type circulation coating device. The urethane roller was immersed in the coating device and picked up, followed by air-drying for 40 minutes and heating at 90° C. for 1 hour. Thereafter, a urethane roller in which the insulating portions were formed was obtained by curing the insulating portions by irradiating, with UV light, a surface of the urethane roller to which the mixture was attached so that a cumulative light amount would be 2000 mJ/cm². Further, as a UV irradiation device, a high-pressure mercury lamp (trade name: handy type UV curing device, manufactured by Mario network Co., Ltd.)

Example 22

A urethane roller in which insulating portions were formed was manufactured by the same method as in Example 21.

Then, a material illustrated in the following Table 8 was impregnated into an elastic layer of this urethane roller.

TABLE 8

| Material | Parts by mass |
|---|---|
| Vinyl monomer (impregnation component: compound for forming second resin): vinyl benzoate (prepared by Kokyo Chemical Industry Co., Ltd.) | 100 |
| Polymerization initiator: tert-butyl-peroxy-2-ethyl hexyl monocarbonate (polymerization initiator: Perbutyl E, prepared by NOF CORPORATION) | 5 |

Specifically, a mixture (material for forming a second resin) obtained by weighing respective materials shown in Table 8 and adding MEK thereto to dissolve these materials was placed into an overflow type circulation coating device. After immersing the urethane roller in which the insulating portions were formed in the coating device and picking the urethane roller up, air-drying was performed thereon for 40 minutes. Next, an electrophotographic roller in which an elastic layer was formed and insulating portions were formed on this elastic layer was obtained by heating and curing the impregnation component at 120° C. for 2 hours.

Further, in the electrophotographic roller obtained in Example 22, the presence of a urethane resin and a cured product (second resin) of the impregnation component (vinyl monomer) was confirmed in an electroconductive portion of the elastic layer, but it was impossible to confirm the presence of the second resin in an insulation covered portion.

Example 23

Neopentyl glycol dimethacrylate (trade name; NPG, prepared by Shin-nakamura chemical Co., Ltd.) was used instead of PO-modified neopentyl glycol diacrylate as an impregnation component in Example 1. Further, at the time of immersing and curing a second resin in the urethane roller and then applying the above-mentioned material for forming an insulating portion onto an outer peripheral surface of the obtained urethane roller using an overflow type circulation coating device, this material was applied using an ink jet head instead of the overflow type circulation coating device. An electrophotographic roller was manufactured in the same manner as in Example 1 except for the above-mentioned differences. A specific application method using this ink jet head will be described below.

(Application Method by Ink Jet Head)

In the used ink jet head, a nozzle plate in which the same number (i.e., 100) of nozzles as that of flow paths were formed by laser processing was adhered to an actuator block in which 100 flow path structures were formed. Further, in this inkjet head, a diameter on the injection side of each nozzle was 26 μm, and an interval between respective flow paths and an interval between respective nozzles were 300 μm. In addition, a voltage was applied to the actuator through a flexible cable individually connected to an electrode of each flow path. Further, a resonance frequency of each flow path in a state in which the ink jet head was filled with water was 40 kHz on average.

The ink jet head was filled with a paint (material for forming an insulating portion) prepared in advance, and a voltage and timing of a drive waveform were adjusted so that an ejection amount per nozzle was approximately 10 pL. Further, the paint was applied using the ink jet head so that an interval between landing positions on the urethane roller was 60 μm in both a nozzle row direction of the ink jet head and a direction (scan direction) perpendicular to the nozzle row direction. After standing for 10 minutes after application, the paint was irradiated with UV light using a high-pressure mercury lamp (trade name: Handy type UV curing device, manufactured by Mario Network Co., Ltd.) so that a cumulative light amount would be 2000 mJ/cm$^2$. In this way, the insulating component was cured, thereby obtaining an electrophotographic roller in which bowl-shaped insulating portions were formed by a pitch of 60 μm.

Evaluation was performed on the insulating portions and the elastic layer of the obtained electrophotographic roller by the same method as in Example 1. As a result, it was confirmed that an average height of the insulating portions was 20 μm, and the second resin was contained in both the electroconductive portion and the insulation covered portion in a region at a depth of at least 1 μm from the surface.

Example 24

At the time of immersing and curing a second resin in the urethane roller and then applying the above-mentioned material for forming an insulating portion onto an outer peripheral surface of the obtained urethane roller using an overflow type circulation coating device in Example 1, this material was applied using an ink jet head instead of the overflow type circulation coating device. In addition, at the time of irradiating, with UV light, an outer surface of the urethane roller to which this material was attached, a low-pressure mercury lamp (trade name: low-pressure mercury lamp, manufactured by Sun energy Corp.) was used instead of the high-pressure mercury lamp. An electrophotographic roller was manufactured in the same manner as in Example 1 except for the above-mentioned differences.

Example 25

A mixture (material for forming a second resin) in which the materials shown in Table 7 described above were dissolved in MEK was applied onto the outer peripheral surface of the obtained urethane roller, and an impregnation component (acrylic compound) was impregnated into the elastic layer, thereby forming an elastic layer. Specifically, a mixture obtained by weighing respective materials shown in Table 7 and adding MEK thereto to well-dissolve these materials was placed into an overflow type circulation coating device. The urethane roller was immersed in the coating device and picked up, followed by air-drying for 40 minutes and heating at 90° C. for 1 hour. Thereafter, the elastic layer was formed by curing the impregnation component impregnated into the elastic layer by irradiating, with UV light, an outer surface of the urethane roller to which the mixture was attached thereto so that a cumulative light amount would be 2000 mJ/cm$^2$. Further, as a UV irradiation device, a high-pressure mercury lamp (trade name: handy type UV curing device, manufactured by Mario network Co., Ltd.) was used.

In addition, insulating portions were formed on this elastic layer, using materials shown in Table 9.

TABLE 9

| Material | Parts by mass |
|---|---|
| Silicone resin (insulating portion: compound for forming insulating resin) methyl-containing oligomer (trade name: X-40-8225, prepared by Shin-Etsu Chemical Co., Ltd.) | 100 |
| Curing catalyst: titanium-based curing catalyst (trade name: D50, prepared by Shin-Etsu Chemical Co., Ltd.) | 5 |

Specifically, a mixture (material for forming an insulating portion) obtained by weighing respective materials shown in Table 9 and adding MEK thereto to well-dissolve these materials was placed into an overflow type circulation coating device. The roller in which the elastic layer was formed was immersed in the coating device and picked up, followed by air-drying for 40 minutes and heating at 150° C. for 2 hours to cure the insulating portions, thereby obtaining an electrophotographic roller in which insulating portions were formed.

Example 26

A mixture (material for forming a second resin) in which the materials shown in Table 8 described above were dissolved in MEK was applied onto the outer peripheral surface of the obtained urethane roller, and an impregnation component (vinyl monomer) was impregnated into the elastic layer, thereby forming an elastic layer. Specifically, a mixture obtained by weighing respective materials shown in Table 8 and adding MEK thereto to well-dissolve these materials was placed into an overflow type circulation coating device. After immersing the urethane roller in the coating device and picking the urethane roller up, air-drying was performed thereon for 40 minutes, followed by heating at 120° C. for 2 hours to cure the impregnation components impregnated into the elastic layer, thereby forming an elastic layer.

Further, an electrophotographic roller was obtained by forming insulating portions on this elastic layer using the materials shown in Table 9 described above by the same method as in Example 25.

Example 27

An electrophotographic roller was manufactured in the same manner as in Example 25 except that polyethylene terephthalate (trade name: vylon 200, prepared by TOYOBO Co., Ltd.) was used instead of the material shown in Table 9 at the time of forming insulating portions.

Example 28

An electrophotographic roller was manufactured in the same manner as in Example 27 except that trimethylol propane triacrylate (trade name: TMPA, prepared by Shin-nakamura chemical Co., Ltd.) was used instead of PO-modified neopentyl glycol diacrylate as an impregnation component.

Examples 29 to 36

As an impregnation component, the materials described in the column of "material for forming second resin" in Table 11 were used. Electrophotographic rollers in Examples 29 to 36 were manufactured in the same manner as in Example 5 except for the above-mentioned difference. Further, as the impregnation component used in respective Examples, products prepared by Toyo Chemical Co., Ltd., were used in all.

Example 37

An electrophotographic roller was manufactured in the same manner as in Example 1 except that the insulating component (compound for forming an insulating resin) in Example 1 was diluted with MEK so as to have a concentration of 2.5 mass % and then used.

Example 38

Trimethylol propane triacrylate (the above-mentioned Structural Formula (B) (trade name: TMPA, prepared by Shin-nakamura chemical Co., Ltd.) was used instead of PO-modified neopentyl glycol diacrylate as an impregnation component in Example 1. Further, the insulating component (compound for forming an insulating resin) was diluted with MEK so as to have a concentration of 2.5 mass % and then used. An electrophotographic roller was manufactured in the same manner as in Example 1 except for the above-mentioned differences.

Examples 39 to 41

Electrophotographic rollers were manufactured in the same manner as in Example 1 except that a usage amount of PO-modified neopentyl glycol diacrylate corresponding to the impregnation component was changed from 100 parts by mass to 80 parts by mass, 70 parts by mass, and 60 parts by mass in Examples 39, 40, and 41, respectively.

Example 42

An electrophotographic roller was manufactured in the same manner as in Example 1 except that methoxy triethylene glycol acrylate (the following Structural Formula (12)) (trade name: AM-30G, prepared by Shin-nakamura chemical Co., Ltd.) was used instead of PO neopentyl glycol diacrylate corresponding to the impregnation component.

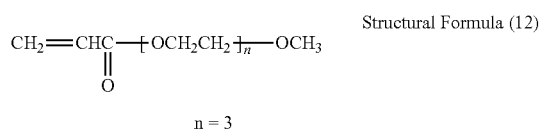

Structural Formula (12)

$n = 3$

Example 43

An electrophotographic roller was manufactured in the same manner as in Example 1 except that methoxynonaethylene glycol acrylate (the following Structural Formula (13)) (trade name: AM-90G prepared by Shin-nakamura chemical Co., Ltd.) was used instead of PO neopentyl glycol diacrylate corresponding to the impregnation component.

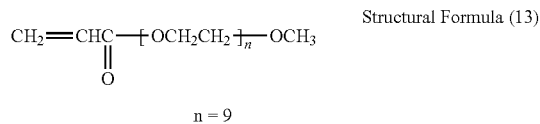

Structural Formula (13)

$n = 9$

Example 44

An electrophotographic roller was manufactured in the same manner as in Example 1 except that ethoxylated lauryl acrylate (the following Structural Formula (14)) (trade name: CD9075, prepared by Arkema Inc.) was used instead of PO neopentyl glycol diacrylate corresponding to the impregnation component.

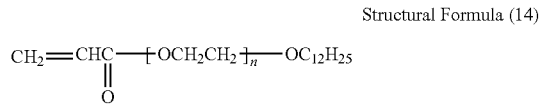

Structural Formula (14)

Example 45

An electrophotographic roller was manufactured in the same manner as in Example 1 except that ethylene glycol dimethacrylate (the following Structural Formula (15)) (trade name: 1G prepared by Shin-nakamura chemical Co., Ltd.) was used instead of PO neopentyl glycol diacrylate corresponding to the impregnation component.

Structural Formula (15)

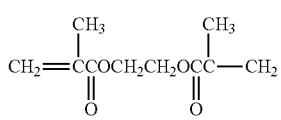

Example 46

An electrophotographic roller was manufactured in the same manner as in Example 1 except that dodecanediol dimethacrylate (the following Structural Formula (16)) (trade name: CD262, prepared by Arkema Inc.) was used instead of PO neopentyl glycol diacrylate corresponding to the impregnation component.

Structural Formula (16)

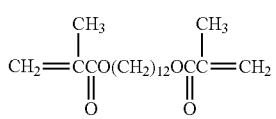

Example 47

An electrophotographic roller was manufactured in the same manner as in Example 1 except that ethoxylated hexanediol diacrylate (the following Structural Formula (17)) (trade name: CD561, Tg=−38° C., prepared by Arkema Inc.) was used instead of PO neopentyl glycol diacrylate corresponding to the impregnation component.

Structural Formula (17)

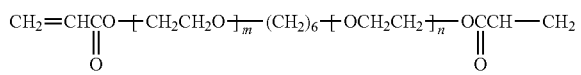

Example 48

An electrophotographic roller was manufactured in the same manner as in Example 1 except that diethylene glycol methacrylate (the following Structural Formula (18)) (trade name: 2G, prepared by Shin-nakamura chemical Co., Ltd.) was used instead of PO neopentyl glycol diacrylate corresponding to the impregnation component.

Structural Formula (18)

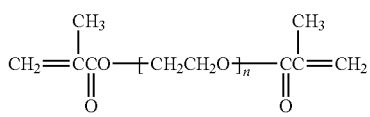

n = 2

Example 49

An electrophotographic roller was manufactured in the same manner as in Example 1 except that polyethylene glycol dimethacrylate (the following Structural Formula (19)) (trade name: 14G, prepared by Shin-nakamura chemical Co., Ltd.) was used instead of PO neopentyl glycol diacrylate corresponding to the impregnation component.

Structural Formula (19)

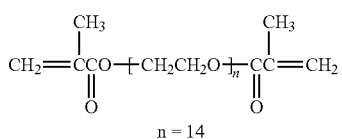

n = 14

Example 50

An electrophotographic roller was manufactured in the same manner as in Example 1 except that polypropylene glycol diacrylate (the following Structural Formula (20)) (trade name: 9PG, prepared by Shin-nakamura chemical Co., Ltd.) was used instead of PO neopentyl glycol diacrylate corresponding to the impregnation component.

Structural Formula (20)

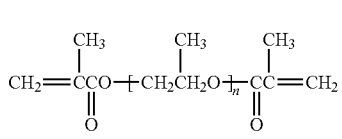

n = 7

Example 51

An electrophotographic roller was manufactured in the same manner as in Example 1 except that polytetramethylene glycol diacrylate (the following Structural Formula (21)) (trade name: PTMGA-250, prepared by KYOEISHA CHEMICAL Co., Ltd.) was used instead of PO neopentyl glycol diacrylate corresponding to the impregnation component.

Structural Formula (21)

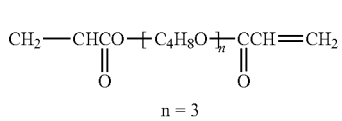

n = 3

Example 52

An electrophotographic roller was manufactured in the same manner as in Example 1 except that hydroxy pivalic acid neopentyl glycol diacrylate (the following Structural Formula (22)) (trade name: HPP-A, prepared by KYOEISHA CHEMICAL Co., Ltd) was used instead of PO neopentyl glycol diacrylate corresponding to the impregnation component.

Structural Formula (22)

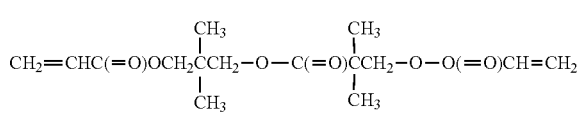

Example 53

An electrophotographic roller was manufactured in the same manner as in Example 1 except that ethoxylated trimethylol propane trimethacrylate (the following Structural Formula (23)) (trade name: TMPT-3E0, prepared by Shin-nakamura chemical Co., Ltd.) was used instead of PO neopentyl glycol diacrylate corresponding to the impregnation component.

Structural Formula (23)

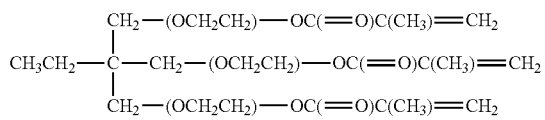

Example 54

An electrophotographic roller was manufactured in the same manner as in Example 1 except that propoxylated trimethylol propane triacrylate (the following Structural Formula (24)) (trade name: A-TMPT-3E0, prepared by Shin-nakamura chemical Co., Ltd.) was used instead of PO neopentyl glycol diacrylate corresponding to the impregnation component.

Structural Formula (24)

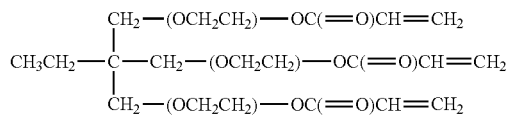

Example 55

An electrophotographic roller was manufactured in the same manner as in Example 1 except that ethoxylated glycerin triacrylate (the following Structural Formula (25)) (trade name: A-GLY-3 E, prepared by Shin-nakamura chemical Co., Ltd.) was used instead of PO neopentyl glycol diacrylate corresponding to the impregnation component.

Structural Formula (25)

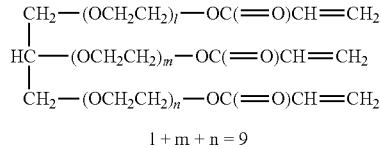

$l + m + n = 9$

Example 56

An electrophotographic roller was manufactured in the same manner as in Example 1 except for using ethoxylated glycerin triacrylate (the following Structural Formula (26)) (trade name: A-GLY-6 E, prepared by Shin-nakamura chemical Co., Ltd.) instead of PO neopentyl glycol diacrylate corresponding to the impregnation component.

Structural Formula (26)

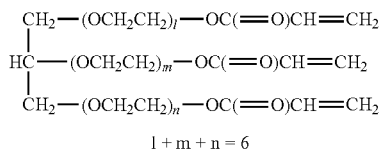

$l + m + n = 6$

Example 57

An electrophotographic roller was manufactured in the same manner as in Example 1 except that propoxylated glycerin triacrylate (the following Structural Formula (27)) (trade name: A-GLY-3 P, prepared by Shin-nakamura chemical Co., Ltd.) was used instead of PO neopentyl glycol diacrylate corresponding to the impregnation component.

Structural Formula (27)

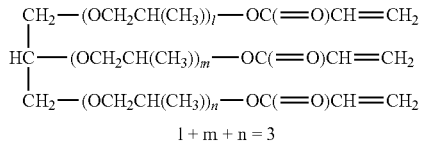

$l + m + n = 3$

Example 58

An electrophotographic roller was manufactured in the same manner as in Example 30 except that acrylic particles (trade name: MX1000, prepared by Soken Chemical & Engineering Co., Ltd.) were used instead of urethane particles: C600 transparent shown in Table 2. In addition, an elastic modulus of the acrylic particles was measured by the above-mentioned method using SPM, and as a result, the elastic modulus was 3.1 GPa.

Example 59

An electrophotographic roller was manufactured in the same manner as in Example 1 except that acrylic particles (trade name: MX1000, prepared by Soken Chemical & Engineering Co., Ltd.) were used instead of urethane particles: C600 transparent shown in Table 2.

Example 60

An electrophotographic roller was manufactured in the same manner as in Example 3 except that 2-hydoxy-1-{4-[4-(2-hydroxy-2-methylpropionyl)-benzyl]-phenyl}-2-methyl propan-1-one (trade name: IRGACURE127, prepared by BASF Japan Ltd.) was used instead of 1-hydoxy-cyclohexyl phenyl ketone as a polymerization initiator.

Example 61

An electrophotographic roller was manufactured in the same manner as in Example 1 except that 2-hydoxy-1-{4-[4-(2-hydroxy-2-methylpropionyl)-benzyl]-phenyl}-2-methyl propan-1-one (trade name: IRGACURE127, prepared by BASF Japan Ltd.) was used instead of 1-hydoxy-cyclohexyl phenyl ketone as a polymerization initiator.

Comparative Example 1

An electrophotographic roller was manufactured in the same manner as in Example 1 except that PO-modified neopentyl glycol diacrylate corresponding to the impregnation component was not used, and each evaluation was performed thereon. In addition, as a result of observing an outer surface of the obtained electrophotographic roller using the above-mentioned microscopic IR, it was confirmed that dipentaerythritol tetraacrylate corresponding to the insulating component was not impregnated into the elastic layer.

In the case of using the electrophotographic roller obtained from Comparative Example 1, a surface potential of a portion of the developing roller corresponding to an opening portion of a process cartridge after standing for a long period of time was low as compared to the cases in the above-mentioned Examples, and thus, image density was also low. Therefore, a surface potential difference or image density difference was also increased as compared to Examples.

Comparative Example 2

PO-modified neopentyl glycol diacrylate corresponding to the impregnation component and 1-hydroxy-cyclohexyl phenyl ketone corresponding to the polymerization initiator in Example 1 were not used. Further, as an insulating component, polyethylene terephthalate (trade name: vylon 200, prepared by TOYOBO Co., Ltd.) corresponding to a thermoplastic resin was used instead of dipentaerythritol tetraacrylate. UV irradiation was not performed on an outer surface of a urethane roller to which a material for forming an insulating portion was attached. An electrophotographic roller was manufactured in the same manner as in Example 1 except for the above-mentioned differences, and the above-mentioned evaluation was performed thereon.

In the case of using the electrophotographic roller obtained from Comparative Example 2, a surface potential of a portion of the developing roller corresponding to an opening portion of a process cartridge after standing for a long period of time was low as compared to the cases in the above-mentioned Examples, and thus, image density was also low. Therefore, a surface potential difference or image density difference was also increased as compared to Examples.

Comparative Example 3

An electrophotographic roller was manufactured in the same manner as in Example 26 except that an impregnation component was not applied onto an outer peripheral surface of the obtained urethane roller and insulating portions were directly formed on the elastic layer using materials shown in Table 9 described above, and each evaluation was performed thereon.

In the case of using the electrophotographic roller obtained from Comparative Example 3, a surface potential of a portion of the developing roller corresponding to an opening portion of a process cartridge after standing for a long period of time was low as compared to the cases in the above-mentioned Examples, and thus, image density was also low. Therefore, a surface potential difference or image density difference was also increased as compared to Examples.

Comparative Example 4

An elastic layer was formed using the same material and the same method except for replacing carbon black MA100 among the materials shown in Table 2 with #4000 B (trade name, prepared by Mitsubishi Chemical Corporation) on a peripheral surface of the elastic roller having the silicone rubber layer (inner layer) manufactured in Example 1, such that a urethane roller 1 was manufactured. Next, a mixture obtained by dispersing materials shown in Table 10 in MEK was impregnated into a peripheral surface of the urethane roller 1.

TABLE 10

| Material | Parts by mass |
| --- | --- |
| Acrylic compound (impregnation component: compound for forming second resin): PO-modified neopentyl glycol diacrylate (Structural Formula (10))(trade name: EBECRY145, prepared by DAICEL-ALLNEX LTD.) | 100 |
| Polymerization initiator: 1-hydroxy-cyclohexyl phenyl ketone (polymerization initiator: ERGACURE184, prepared by BASF) | 5 |

Specifically, a mixture obtained by weighing respective materials shown in Table 10 and adding MEK thereto to well-dissolve these materials so that a solid concentration of the impregnation component was 10% was placed into an overflow type circulation coating device. The urethane roller 1 was immersed in the coating device and picked up. Thereafter, the same procedure as in Example 1 was performed except for UV light irradiation so that a cumulative light amount would be 1500 mJ/cm$^2$. As a result of observing a surface of the obtained electrophotographic roller using an optical microscope (VHX5000 (product name), manufactured by Keyence Corp.), it was confirmed there was no insulating portion.

Further, as a result of analyzing the surface of the obtained electrophotographic roller using a microscopic IR (trade name: Fully automated microscopic FT-IR system: LUMOS, manufactured by Bruker Optics), the presence of a second resin was confirmed by confirming a peak derived from a resin formed from the compound of Structural Formula (10). In the evaluation of the image density difference, the image density was extremely low because there was no insulating portion, no gradient force was generated, and there was no force for attracting the toner. Next, with respect to the electrophotographic roller according to Comparative Example 4, 1 g of rubber piece including an outer surface was cut off, and immersed in 200 ml of MEK for 3 days. Thereafter, the rubber piece was picked up, and MEK after immersion was volatilized. As a result of analyzing the residue using GC-MS (GCMS QP2020 (product name), manufactured by Shimadzu Corporation), it was confirmed that a peak derived from the compound of Structural Formula (10) was present, and it was confirmed that an unreacted compound of Structural Formula (10) was contained in the electrophotographic roller according to Comparative Example 4.

The components used in the electrophotographic roller in respective Examples, evaluation results and the like were shown in the following Tables 11 to 22.

TABLE 11

| | | Second resin | | Presence in region of depth of 1 μm from surface | | Insulating domain material | | | Height of insulating portion (μm) | Toner conveyance amount difference (mg/cm²) | Surface potential difference | Elastic modulus (GPa) | Rank |
|---|---|---|---|---|---|---|---|---|---|---|---|---|---|
| | Impregnation material | Structural Formula | Structure | Electro-conductive portion | Insulation-covered portion | Material | Structural Formula | Structure of cured product | | | | | |
| Example 1 | PO-modified neopentyl glycol diacrylate | 2,3 | *PO-modified neopentyl glycol | Y | Y | Dipenta-erythritol hexaacrylate | 6 | *Dipenta-erythritol | 1.0 | 0.06 | 2.1 | 4.1 | B |
| Example 2 | Trimethyl propane triacrylate | 2,6 | *Trimethyl propane | Y | Y | Dipenta-erythritol hexaacrylate | 6 | *Dipenta-erythritol | 0.8 | 0.03 | 1.4 | 8.3 | A |
| Example 3 | Neopentyl glycol dimethacrylate | 2 | *Neopentyl glycol | Y | Y | Dipenta-erythritol hexaacrylate | 6 | *Dipenta-erythritol | 1.5 | 0.09 | 1.7 | 5.6 | B |
| Example 4 | Neopentyl glycol dimethacrylate | 2 | *Neopentyl glycol | Y | Y | Propoxylated bisphenol diacrylate | 6 | *Pro-poxylated bisphenol | 1.2 | 0.04 | 1.3 | 5.4 | A |
| Example 5 | 4-tert-butylstyrene | 1 (X1=R15) | 4-tert-butyl group | Y | Y | Dipenta-erythritol hexaacrylate | 6 | *Dipenta-erythritol | 1.3 | 0.11 | 3.5 | 2.1 | C |
| Example 6 | Allyl phenyl ether | 1 (X1=CH2OR13) | Phenyl group | Y | Y | Dipenta-erythritol hexaacrylate | 6 | *Dipenta-erythritol | 0.9 | 0.13 | 4.1 | 2.2 | C |
| Example 7 | Vinyl benzoate | 1 (X1=OCOR14) | Phenyl group | Y | Y | Dipenta-erythritol hexaacrylate | 6 | *Dipenta-erythritol | 1.6 | 0.14 | 4.3 | 2.1 | C |
| Example 8 | PO-modified neopentyl glycol diacrylate | 2,3 | *PO-modified neopentyl glycol | Y | Y | Polyethylene terephthalate | | | 1.5 | 0.08 | 1.9 | 4.4 | B |
| Example 9 | Trimethyl propane triacrylate | 2,6 | *Trimethyl propane | Y | Y | Polyethylene terephthalate | | | 1.4 | 0.03 | 1.3 | 8.6 | A |
| Example 10 | 4-tertbutyl-styrene | 1 (X1=R15) | 4-tert-butyl group | Y | Y | Polyethylene terephthalate | | | 1.8 | 0.11 | 3.9 | 2.3 | C |
| Example 11 | PO-modified neopentyl glycol diacrylate | 2,3 | *PO-modified neopentyl glycol | Y | Y | Polystyrene having salicylic acid structure | 7 | Salicylic acid structure | 2.2 | 0.04 | 1.1 | 3.9 | A |
| Example 12 | Trimethyl propane triacrylate | 2,6 | Trimethyl propane | Y | Y | Polystyrene having salicylic acid structure | 7 | Salicylic acid structure | 1.6 | 0.03 | 0.9 | 8.4 | A |
| Example 13 | 4-tertbutyl styrene | 1 (X1=R15) | 4-tert-butyl group | Y | Y | Polystyrene having salicylic acid structure | 7 | Salicylic acid structure | 1.5 | 0.08 | 2.2 | 2.4 | B |
| Example 14 | PO-modified neopentyl glycol diacrylate | 2,3 | *PO-modified neopentyl glycol | Y | Y | Styrene acryl copolymer | 7 | | 1.7 | 0.08 | 2.3 | 4.3 | B |
| Example 15 | PO-modified neopentyl glycol diacrylate | 2,3 | *PO-modified neopentyl glycol | Y | Y | Aromatic-containing polyester acryl | 6 | | 1.3 | 0.03 | 1.3 | 4.2 | A |
| Example 16 | Trimethyl propane triacrylate | 2,6 | Trimethyl propane | Y | Y | Aromatic-containing polyester acryl | 6 | | 1.4 | 0.04 | 1.1 | 8.1 | A |
| Example 17 | 4-tertbutyl styrene | 1 (X1=R15) | 4-tert-butyl group | Y | Y | Aromatic-containing polyester acryl | 6 | | 1.6 | 0.06 | 2.7 | 2.1 | B |
| Example 18 | PO-modified neopentyl glycol diacrylate | 2,3 | *PO-modified neopentyl glycol | Y | Y | Polystyrene | 7 | | 1.3 | 0.07 | 1.9 | 4.4 | B |
| Example 19 | PO-modified neopentyl glycol diacrylate | 2,3 | *PO-modified neopentyl glycol | Y | Y | Poly-carbonate | | | 1.7 | 0.06 | 2.4 | 4.2 | B |

TABLE 11-continued

| | Second resin | | Presence in region of depth of 1 μm from surface | | Insulating domain material | | | Height of insulating portion (μm) | Toner conveyance amount difference (mg/cm$^{-2}$) | Surface potential difference | Elastic modulus (GPa) | Rank |
|---|---|---|---|---|---|---|---|---|---|---|---|---|
| | Impregnation material | Structural Formula | Structure | Electroconductive portion | Insulation-covered portion | Material | Structural Formula | Structure of cured product | | | | | |
| Example 20 | PO-modified neopentyl glycol diacrylate | 2,3 | *PO-modified neopentyl glycol | Y | Y | Polyacrylate | | | 1.1 | 0.08 | 2.8 | 4.3 | B |
| Example 21 | PO-modified neopentyl glycol diacrylate | 2,3 | *PO-modified neopentyl glycol | Y | N | Dipentaerythritol hexaacrylate | 6 | *Dipentaerythritol | 20.0 | 0.15 | 3.7 | 4.1 | C |
| Example 22 | Vinyl benzoate | 1 (X1=OCOR14) | Phenyl group | Y | N | Dipentaerythritol hexaacrylate | 6 | *Dipentaerythritol | 21.3 | 0.18 | 4.7 | 1.9 | D |

TABLE 12

| | Second resin | | Presence in region of depth of 1 μm from surface | | Insulating domain material | | | Height of insulating portion (μm) | Toner conveyance amount difference (mg/cm$^{-2}$) | Surface potential difference | Elastic modulus (GPa) | Rank |
|---|---|---|---|---|---|---|---|---|---|---|---|---|
| | Impregnation material | Structural Formula | Structure | Electroconductive portion | Insulation-covered portion | Matreial | Structural Formula | Structure of cured product | | | | | |
| Example 23 | Neopentyl glycol dimethacrylate | 2 | *Neopentyl glycol | Y | Y | Dipentaerythritol hexaacrylate | 6 | *Dipentaerythritol | 1.3 | 0.08 | 2.6 | 5.7 | B |
| Example 24 | PO-modified neopentyl glycol diacrylate | 2,3 | *PO-modified neopentyl glycol | Y | Y | Dipentaerythritol hexaacrylate | 6 | *Dipentaerythritol | 1.2 | 0.07 | 2.7 | 4.3 | B |
| Example 25 | PO-modified neopentyl glycol diacrylate | 2,3 | *PO-modified neopentyl glycol | Y | Y | Silicone resin | | | 1.3 | 0.14 | 3.6 | 4 | C |
| Example 26 | Vinyl benzoate | 1 (X1=OCOR14) | Phenyl group | Y | Y | Silicone resin | | | 1.2 | 0.16 | 4.4 | 1.8 | D |
| Example 27 | PO-modified neopentyl glycol diacrylate | 2,3 | *PO-modified neopentyl glycol | Y | Y | Polyethylene terephthalate | | | 1.4 | 0.07 | 1.6 | 4.4 | B |
| Example 28 | Trimethyl propane diacrylate | 2,6 | *Trimethyl propane | Y | Y | Polyethylene terephthalate | | | 1.1 | 0.04 | 1.2 | 8.4 | A |
| Example 29 | ethyl acrylate | 1 (X1=COOR12) | Ethyl group | Y | Y | Dipentaerythritol hexaacrylate | 6 | *Dipentaerythritol | 1.3 | 0.13 | 3.5 | 2.6 | C |
| Example 30 | Stearyl acrylate | 1 (X1=COOR12) | Octadecyl group | Y | Y | Dipentaerythritol hexaacrylate | 6 | *Dipentaerythritol | 1.6 | 0.12 | 3.8 | 1.3 | C |
| Example 31 | Allyl acetate | 1 (X1=CH$_2$OR13) | Acyl group | Y | Y | Dipentaerythritol hexaacrylate | 6 | *Dipentaerythritol | 1.2 | 0.14 | 4.1 | 1.7 | C |
| Example 32 | Butyl allyl ether | 1 (X1=CH$_2$OR13) | Butyl group | Y | Y | Dipentaerythritol hexaacrylate | 6 | *Dipentaerythritol | 1.6 | 0.15 | 3.9 | 1.1 | C |
| Example 33 | Allyl-n-octyl | 1 (X1=CH$_2$OR13) | n-octyl group | Y | Y | Dipentaerythritol hexaacrylate | 6 | *Dipentaerythritol | 1.1 | 0.14 | 3.6 | 1 | C |
| Example 34 | Vinyl butyrate | 1 (X1=OCOR14) | Propyl group | Y | Y | Dipentaerythritol hexaacrylate | 6 | *Dipentaerythritol | 1.2 | 0.13 | 4.1 | 1.4 | C |

TABLE 12-continued

| | | Second resin | | Presence in region of depth of 1 μm from surface | | Insulating domain material | | | Height of insulating portion (μm) | Toner conveyance amount differ- ence (mg/cm²) | Surface poten- tial differ- ence | Elastic mod- ulus (GPa) | Rank |
|---|---|---|---|---|---|---|---|---|---|---|---|---|---|
| | Impregnation material | Structural Formula | Electro- con- ductive portion | Insu- lation- covered portion | covered portion | Material | Struc- tural Formula | Structure of cured product | | | | | |
| Example 35 | Vinyl palmitate | 1 (X1=OCOR14) | Butadecyl group | Y | Y | Dipenta-erythritol hexaacrylate | 6 | *Dipenta-erythritol | 1.3 | 0.14 | 3.8 | 1.1 | C |
| Example 36 | Styrene | 1 (X1=R15) | Phenyl group | Y | Y | Dipenta-erythritol hexaacrylate | 6 | *Dipenta-erythritol | 1.1 | 0.13 | 3.6 | 2.1 | C |
| Example 37 | PO-modified neopentyl glycol diacrylate | 2,3 | *PO-modified neopentyl glycol | Y | Y | Dipenta-erythritol hexaacrylate | 6 | *Dipenta-erythritol | 0.4 | 0.15 | 3.4 | 4.1 | C |
| Example 38 | Trimethyl propane triacrylate | 2,6 | *Trimethyl propane | Y | Y | Dipenta-erythritol hexaacrylate | 6 | *Dipenta-erythritol | 0.3 | 0.06 | 2.7 | 8.1 | B |
| Example 39 | PO-modified neopentyl glycol diacrylate | 2,3 | *PO-modified neopentyl glycol | Y | Y | Dipenta-erythritol hexaacrylate | 6 | *Dipenta-erythritol | 1.1 | 0.08 | 2.4 | 3.7 | B |
| Example 40 | PO-modified neopentyl glycol diacrylate | 2,3 | *PO-modified neopentyl glycol | Y | Y | Dipenta-erythritol hexaacrylate | 6 | *Dipenta-erythritol | 0.9 | 0.10 | 2.2 | 3.3 | B |
| Example 41 | PO-modified neopentyl glycol diacrylate | 2,3 | *PO-modified neopentyl glycol | Y | Y | Dipenta-erythritol hexaacrylate | 6 | *Dipenta-erythritol | 1.2 | 0.09 | 2.3 | 2.9 | B |
| Example 42 | Methoxy poly-propylene glycol acrylate | 1 | *Methoxy poly-propylene glycol | Y | Y | Dipenta-erythritol hexaacrylate | 6 | *Dipenta-erythritol | 0.9 | 0.14 | 3.3 | 1.1 | C |
| Example 43 | Methoxy polyethylene glycol acrylate | 1 | *Methoxy polyethylene glycol | Y | Y | Dipenta-erythritol hexaacrylate | 6 | *Dipenta-erythritol | 1.4 | 0.13 | 3.8 | 1.2 | C |
| Example 44 | Ethoxylated lauryl acrylate | 1 | *dodecoxy ethylene glycol | Y | Y | Dipenta-erythritol hexaacrylate | 6 | *Dipenta-erythritol | 1.3 | 0.13 | 4.1 | 1.1 | C |

TABLE 13

| | | Second resin | | Presence in region of depth of 1 μm from surface | | Insulating domain material | | | Height of insulating portion (μm) | Toner conveyance amount differ- ence (mg/cm²) | Surface poten- tial differ- ence | Elastic mod- ulus (GPa) | Rank |
|---|---|---|---|---|---|---|---|---|---|---|---|---|---|
| | Impregnation material | Structural Formula | Structure | Electro- con- ductive portion | Insu- lation- covered portion | Material | Struc- tural Formula | Structure of cured product | | | | | |
| Example 45 | Ethylene glycol dimethacrylate | 2 | Ethylene group | Y | Y | Dipenta-erythritol hexaacrylate | 6 | *Dipenta-erythritol | 1.0 | 0.08 | 2.6 | 6.1 | B |
| Example 46 | Dodecanediol dimethacrylate | 2 | *Dodecane-1,12-yl group | Y | Y | Dipenta-erythritol hexaacrylate | 6 | *Dipenta-erythritol | 0.8 | 0.07 | 2.3 | 4.9 | B |
| Example 47 | Ethoxylated hexanediol diacrylate | 2,3 | *EO-modified hexanediol | Y | Y | Dipenta-erythritol hexaacrylate | 6 | *Dipenta-erythritol | 1.4 | 0.09 | 2.9 | 4.1 | B |
| Example 48 | Diethylene glycol dimethacrylate | 2,4 | *Diethylene glycol | Y | Y | Dipenta-erythritol hexaacrylate | 6 | *Dipenta-erythritol | 1.1 | 0.08 | 2.4 | 5.9 | B |

TABLE 13-continued

| | Impregnation material | Second resin Structural Formula | Second resin Structure | Presence in region of depth of 1 μm from surface Electro-conductive portion | Presence in region of depth of 1 μm from surface Insulation-covered portion | Insulating domain material Material | Insulating domain material Structural Formula | Insulating domain material Structure of cured product | Height of insulating portion (μm) | Toner conveyance amount (mg/cm$^{-2}$) | Surface potential difference | Elastic modulus (GPa) | Rank |
|---|---|---|---|---|---|---|---|---|---|---|---|---|---|
| Example 49 | Polyethylene dimethacrylate | 2,4 | *Polyethylene glycol | Y | Y | Dipentaerythritol hexaacrylate | 6 | *Dipentaerythritol | 1.3 | 0.07 | 1.9 | 3.6 | B |
| Example 50 | Polypropylene glycol diacrylate | 2,4 | *Polypropylene glycol | Y | Y | Dipentaerythritol hexaacrylate | 6 | *Dipentaerythritol | 0.8 | 0.08 | 2.0 | 4.1 | B |
| Example 51 | Polytetramethylene glycol diacrylate | 2,4 | *Polytetramethylene glycol | Y | Y | Dipentaerythritol hexaacrylate | 6 | *Dipentaerythritol | 0.9 | 0.10 | 2.8 | 4.4 | B |
| Example 52 | Hydroxy pivalic acid neopentyl glycol acrylic acid adduct | 2,5 | *Hydroxy pivalic acid neopentyl glycol | Y | Y | Dipentaerythritol hexaacrylate | 6 | *Dipentaerythritol | 1.4 | 0.08 | 2.4 | 4.1 | B |
| Example 53 | Ethoxylated trimethylol propane trimethacrylate | 2,6 | *Ethoxylated trimethylol propane | Y | Y | Dipentaerythritol hexaacrylate | 6 | *Dipentaerythritol | 1.5 | 0.03 | 1.4 | 7.5 | A |
| Example 54 | Propoxylated trimethylol propane triacrylate | 2,6 | *Propoxylated trimethylol propane | Y | Y | Dipentaerythritol hexaacrylate | 6 | *Dipentaerythritol | 1.3 | 0.04 | 1.2 | 7.2 | A |
| Example 55 | Ethoxylated glycerin triacrylate | 2 | *Ethoxylated glycerin | Y | Y | Dipentaerythritol hexaacrylate | 6 | *Dipentaerythritol | 1.0 | 0.03 | 1.3 | 7.4 | A |
| Example 56 | Ethoxylated glycerin triacrylate | 2 | *Ethoxylated glycerin | Y | Y | Dipentaerythritol hexaacrylate | 6 | *Dipentaerythritol | 0.9 | 0.04 | 1.2 | 6.7 | A |
| Example 57 | Propoxylated glycerin triacrylate | 2 | *Propoxylated glycerin | Y | Y | Dipentaerythritol hexaacrylate | 6 | *Dipentaerythritol | 1.2 | 0.02 | 1.4 | 7.1 | A |
| Example 58 | Stearyl acrylate | 1 (X1=COOR12) | Octadecyl group | Y | Y | Dipentaerythritol hexaacrylate | 6 | *Dipentaerythritol | 1.4 | 0.07 | 1.9 | 1.4 | B |
| Example 59 | PO-modified neopentyl glycol diacrylate | 2,3 | *PO-modified neopentyl glycol | Y | Y | Dipentaerythritol hexaacrylate | 6 | *Dipentaerythritol | 1.1 | 0.03 | 1.1 | 4.2 | A |
| Example 60 | Neopentyl glycol dimethacrylate | 2 | *Neopentyl glycol | Y | Y | Dipentaerythritol hexaacrylate | 6 | *Dipentaerythritol | 1.1 | 0.02 | 1.3 | 10.1 | A |
| Example 61 | PO-modified neopentyl glycol diacrylate | 2,3 | *PO-modified neopentyl glycol | Y | Y | Dipentaerythritol hexaacrylate | 6 | *Dipentaerythritol | 1.2 | 0.02 | 1.2 | 14.1 | A |

TABLE 14

| | | Material for forming insulating portion Material | Structural Formula | Structure of cured product |
|---|---|---|---|---|
| Example | 1 | Dipentaerythritol hexaacrylate | 6 | *Dipentaerythritol |
| | 2 | Dipentaerythritol hexaacrylate | 6 | *Dipentaerythritol |
| | 3 | Dipentaerythritol hexaacrylate | 6 | *Dipentaerythritol |
| | 4 | Propoxylated bisphenol diacrylate | 6 | *Propoxylated bisphenol |
| | 5 | Dipentaerythritol hexaacrylate | 6 | *Dipentaerythritol |
| | 6 | Dipentaerythritol hexaacrylate | 6 | *Dipentaerythritol |
| | 7 | Dipentaerythritol hexaacrylate | 6 | *Dipentaerythritol |
| | 8 | Polyethylene terephthalate | | — |
| | 9 | Polyethylene terephthalate | | — |

TABLE 14-continued

| | | Material | Structural Formula | Structure of cured product |
|---|---|---|---|---|
| | 10 | Polyethylene terephthalate | | — |
| | 11 | Polystyrene having salicylic acid structure | 7 | Salicylic acid structure |
| | 12 | Polystyrene having salicylic acid structure | 7 | Salicylic acid structure |
| | 13 | Polystyrene having salicylic acid structure | 7 | Salicylic acid structure |
| | 14 | Styrene acryl copolymer | 7 | — |
| | 15 | Aromatic-containing polyester acryl | 6 | — |
| | 16 | Aromatic-containing polyester acryl | 6 | — |
| | 17 | Aromatic-containing polyester acryl | 6 | — |
| | 18 | Polystyrene | 7 | — |
| | 19 | Polycarbonate | | — |
| | 20 | Polyarylate | | — |
| | 21 | Dipentaerythritol hexaacrylate | 6 | *Dipentaerythritol |
| | 22 | Dipentaerythritol hexaacrylate | 6 | *Dipentaerythritol |

TABLE 15

| | | Material | Structural Formula | Structure of cured product |
|---|---|---|---|---|
| Example | 23 | dipentaerythritol hexaacrylate | 6 | *dipentaerythritol |
| | 24 | dipentaerythritol hexaacrylate | 6 | *dipentaerythritol |
| | 25 | silicone resin | | — |
| | 26 | silicone resin | | — |
| | 27 | polyethylene terephthalate | | — |
| | 28 | polyethylene terephthalate | | — |
| | 29 | dipentaerythritol hexaacrylate | 6 | *dipentaerythritol |
| | 30 | dipentaerythritol hexaacrylate | 6 | *dipentaerythritol |
| | 31 | dipentaerythritol hexaacrylate | 6 | *dipentaerythritol |
| | 32 | dipentaerythritol hexaacrylate | 6 | *dipentaerythritol |
| | 33 | dipentaerythritol hexaacrylate | 6 | *dipentaerythritol |
| | 34 | dipentaerythritol hexaacrylate | 6 | *dipentaerythritol |
| | 35 | dipentaerythritol hexaacrylate | 6 | *dipentaerythritol |
| | 36 | dipentaerythritol hexaacrylate | 6 | *dipentaerythritol |
| | 37 | dipentaerythritol hexaacrylate | 6 | *dipentaerythritol |
| | 38 | dipentaerythritol hexaacrylate | 6 | *dipentaerythritol |
| | 39 | dipentaerythritol hexaacrylate | 6 | *dipentaerythritol |
| | 40 | dipentaerythritol hexaacrylate | 6 | *dipentaerythritol |
| | 41 | dipentaerythritol hexaacrylate | 6 | *dipentaerythritol |
| | 42 | dipentaerythritol hexaacrylate | 6 | *dipentaerythritol |
| | 43 | dipentaerythritol hexaacrylate | 6 | *dipentaerythritol |
| | 44 | dipentaerythritol hexaacrylate | 6 | *dipentaerythritol |

TABLE 16

| | | Material | Structural Formula | Structure of cured product |
|---|---|---|---|---|
| Example | 45 | Dipentaerythritol hexaacrylate | 6 | *Dipentaerythritol |
| | 46 | Dipentaerythritol hexaacrylate | 6 | *Dipentaerythritol |
| | 47 | Dipentaerythritol hexaacrylate | 6 | *Dipentaerythritol |
| | 48 | Dipentaerythritol hexaacrylate | 6 | *Dipentaerythritol |
| | 49 | Dipentaerythritol hexaacrylate | 6 | *Dipentaerythritol |
| | 50 | Dipentaerythritol hexaacrylate | 6 | *Dipentaerythritol |
| | 51 | Dipentaerythritol hexaacrylate | 6 | *Dipentaerythritol |
| | 52 | Dipentaerythritol hexaacrylate | 6 | *Dipentaerythritol |
| | 53 | Dipentaerythritol hexaacrylate | 6 | *Dipentaerythritol |
| | 54 | Dipentaerythritol hexaacrylate | 6 | *Dipentaerythritol |
| | 55 | Dipentaerythritol hexaacrylate | 6 | *Dipentaerythritol |
| | 56 | Dipentaerythritol hexaacrylate | 6 | *Dipentaerythritol |
| | 57 | Dipentaerythritol hexaacrylate | 6 | *Dipentaerythritol |
| | 58 | Dipentaerythritol hexaacrylate | 6 | *Dipentaerythritol |
| | 59 | Dipentaerythritol hexaacrylate | 6 | *Dipentaerythritol |
| | 60 | Dipentaerythritol hexaacrylate | 6 | *Dipentaerythritol |
| | 61 | Dipentaerythritol hexaacrylate | 6 | *Dipentaerythritol |

TABLE 17

| | Height of insulating portion (μm) | Surface potential difference | Toner conveyance amount difference (mg/cm$^2$) | Elastic modulus (GPa) | Image density difference |
|---|---|---|---|---|---|
| Example 1 | 1.0 | 2.1 | 0.06 | 4.1 | B |
| Example 2 | 0.8 | 1.4 | 0.03 | 8.3 | A |
| Example 3 | 1.5 | 1.7 | 0.09 | 5.6 | B |
| Example 4 | 1.2 | 1.3 | 0.04 | 5.4 | A |
| Example 5 | 1.3 | 3.5 | 0.11 | 2.1 | C |
| Example 6 | 0.9 | 4.1 | 0.13 | 2.2 | C |
| Example 7 | 1.6 | 4.3 | 0.14 | 2.1 | C |
| Example 8 | 1.5 | 1.9 | 0.08 | 4.4 | B |
| Example 9 | 1.4 | 1.3 | 0.03 | 8.6 | A |
| Example 10 | 1.8 | 3.9 | 0.11 | 2.3 | C |
| Example 11 | 2.2 | 1.1 | 0.04 | 3.9 | A |
| Example 12 | 1.6 | 0.9 | 0.03 | 8.4 | A |
| Example 13 | 1.5 | 2.2 | 0.08 | 2.4 | B |
| Example 14 | 1.7 | 2.3 | 0.08 | 4.3 | B |
| Example 15 | 1.3 | 1.3 | 0.03 | 4.2 | A |
| Example 16 | 1.4 | 1.1 | 0.04 | 8.1 | A |
| Example 17 | 1.6 | 2.7 | 0.06 | 2.1 | B |
| Example 18 | 1.3 | 1.9 | 0.07 | 4.4 | B |
| Example 19 | 1.7 | 2.4 | 0.06 | 4.2 | B |
| Example 20 | 1.1 | 2.8 | 0.08 | 4.3 | B |
| Example 21 | 20.0 | 3.7 | 0.15 | 4.1 | C |
| Example 22 | 21.3 | 4.7 | 0.18 | 1.9 | D |

TABLE 18

| | Height of insulating portion (μm) | Surface potential difference | Toner conveyance amount difference (mg/cm$^2$) | Elastic modulus (GPa) | Image density difference |
|---|---|---|---|---|---|
| Example 23 | 1.3 | 2.6 | 0.08 | 5.7 | B |
| Example 24 | 1.2 | 2.7 | 0.07 | 4.3 | B |
| Example 25 | 1.3 | 3.6 | 0.14 | 4 | C |
| Example 26 | 1.2 | 4.4 | 0.16 | 1.8 | D |
| Example 27 | 1.4 | 1.6 | 0.07 | 4.4 | B |
| Example 28 | 1.1 | 1.2 | 0.04 | 8.4 | A |
| Example 29 | 1.3 | 3.5 | 0.13 | 2.6 | C |
| Example 30 | 1.6 | 3.8 | 0.12 | 1.3 | C |
| Example 31 | 1.2 | 4.1 | 0.14 | 1.7 | C |
| Example 32 | 1.6 | 3.9 | 0.15 | 1.1 | C |
| Example 33 | 1.1 | 3.6 | 0.14 | 1 | C |
| Example 34 | 1.2 | 4.1 | 0.13 | 1.4 | C |
| Example 35 | 1.3 | 3.8 | 0.14 | 1.1 | C |
| Example 36 | 1.1 | 3.6 | 0.13 | 2.1 | C |
| Example 37 | 0.4 | 3.4 | 0.15 | 4.1 | C |
| Example 38 | 0.3 | 2.7 | 0.06 | 8.1 | B |
| Example 39 | 1.1 | 2.4 | 0.08 | 3.7 | B |
| Example 40 | 0.9 | 2.2 | 0.10 | 3.3 | B |
| Example 41 | 1.2 | 2.3 | 0.09 | 2.9 | B |
| Example 42 | 0.9 | 3.3 | 0.14 | 1.1 | C |
| Example 43 | 1.4 | 3.8 | 0.13 | 1.2 | C |
| Example 44 | 1.3 | 4.1 | 0.13 | 1.1 | C |

TABLE 19

| | Height of insulating portion (μm) | Surface potential difference | Toner conveyance amount difference (mg/cm$^2$) | Elastic modulus (GPa) | Image density difference |
|---|---|---|---|---|---|
| Example 45 | 1.0 | 2.6 | 0.08 | 6.1 | B |
| Example 46 | 0.8 | 2.3 | 0.07 | 4.9 | B |
| Example 47 | 1.4 | 2.9 | 0.09 | 4.1 | B |
| Example 48 | 1.1 | 2.4 | 0.08 | 5.9 | B |
| Example 49 | 1.3 | 1.9 | 0.07 | 3.6 | B |
| Example 50 | 0.8 | 2.0 | 0.08 | 4.1 | B |
| Example 51 | 0.9 | 2.8 | 0.10 | 4.4 | B |
| Example 52 | 1.4 | 2.4 | 0.08 | 4.1 | B |
| Example 53 | 1.5 | 1.4 | 0.03 | 7.5 | A |
| Example 54 | 1.3 | 1.2 | 0.04 | 7.2 | A |
| Example 55 | 1.0 | 1.3 | 0.03 | 7.4 | A |
| Example 56 | 0.9 | 1.2 | 0.04 | 6.7 | A |
| Example 57 | 1.2 | 1.4 | 0.02 | 7.1 | A |
| Example 58 | 1.4 | 1.9 | 0.07 | 1.4 | B |
| Example 59 | 1.1 | 1.1 | 0.03 | 4.2 | A |
| Example 60 | 1.1 | 1.3 | 0.02 | 10.1 | A |
| Example 61 | 1.2 | 1.2 | 0.02 | 14.1 | A |

TABLE 20

| | | Second resin | | Presence of second resin in region of depth of 1 μm from surface | |
|---|---|---|---|---|---|
| Comparative Example | Material for forming second resin | Structural Formula | Structure | Electroconductive portion | Insulation-covered portion |
| 1 | — | — | — | No | No |
| 2 | — | — | — | No | No |
| 3 | — | — | — | No | No |
| 4 | PO-modified neopentyl glycol diacrylate | 2, 3 | *PO-modified neopentyl glycol | Yes | No |

TABLE 21

| | Material for forming insulating portion | | |
|---|---|---|---|
| | Material | Structural Formula | Structure of cured product |
| Comparative Example 1 | Dipentaerythritol hexaacrylate | 6 | *dipentaerythritol |
| Comparative Example 2 | Polyethylene terephthalate | — | — |
| Comparative Example 3 | Silicone resin | — | — |
| Comparative Example 4 | — | — | — |

TABLE 22

| | Height of insulating portion (μm) | Surface potential difference | Toner conveyance amount difference (mg/cm$^2$) | Elastic modulus (GPa) | Image density difference |
|---|---|---|---|---|---|
| Comparative Example 1 | 1.2 | 7.8 | 0.21 | — | E |
| Comparative Example 2 | 1.1 | 7.9 | 0.26 | — | E |
| Comparative Example 3 | 1.2 | 8.3 | 0.27 | — | F |
| Comparative Example 4 | — | 0.5 | 0.01 | 3.4 | low density |

In Examples 1 to 61, the electrophotographic roller in which the second resin was contained in a region of a depth of at least 1 μm from the surface of the electroconductive portion was manufactured. In an electrophotographic apparatus (color laser printer) in which this electrophotographic roller was mounted as a developing roller, even if the image is output after the electrophotographic apparatus was allowed to stand for a long period of time, it was possible to decrease a surface potential difference between portions of the developing roller corresponding to the opening portion and the other portion of the cartridge. Therefore, as a result, image density unevenness could be suppressed.

In Examples 1 to 3 in which as an acrylic resin or methacrylic resin, a resin having a structural unit represented by Structural Formula (2) was used, a crosslinking density in the vicinity of the surface of the elastic layer was further increased as compared to Examples 5 to 7 and Examples 29 to 36 in which another second resin was used, such that image density unevenness could be further suppressed.

Further, as compared to Examples 21 and 22 in which the second resin was not contained in the region from the surface of the insulation covered portion to a depth of 1 µm, in Examples 1 and 7 in which the acrylic resin or methacrylic resin was contained in this region, a decrease in volume resistivity of the insulating portion could be further suppressed, such that image density unevenness could be further suppressed.

In Examples (for example, Examples 11 to 20) in which the insulating portions were made of the above-mentioned second insulating resin, it was possible to decrease a surface potential difference between portions of the developing roller corresponding to the opening portion and the other portion of the cartridge, such that image density unevenness could be further suppressed.

Among these Examples, in Examples 11, 12, 15, 16, and the like, the insulating portion was made of a resin having a structural unit represented by Structural Formula (7), having an aromatic structure or an alicyclic structure, or a resin having a structural unit represented Structural Formula (8) having a salicylic acid structure as a partial structure. As a result, a decrease in volume resistivity of the insulating portion itself could be further suppressed, such that a decrease amount difference in volume resistance in the circumferential direction of the developing roller was decreased, and thus, image density unevenness could be further suppressed.

Also, as compared to Examples 1 and 3, in Examples 60 and 61, 2-hydroxy-1-{4-[4-(2-hydroxy-2-methyl-propionyl)-benzyl]-phenyl}-2-methylpropan-1-one was used instead of 1-hydroxy-cyclohexyl phenyl ketone as an initiator. As a result, a decrease in volume resistivity of the insulating portion can be further suppressed due to an increase in the crosslinking density in the region of the depth of 1 µm from the surface of the electroconductive portion, such that the image density unevenness could be further suppressed.

Meanwhile, in Comparative Examples 1 to 3, the above-mentioned acrylic resin or methacrylic resin was not contained in the region of the depth of 1 µm from the surface of the electroconductive portion. Therefore, a surface potential difference between portions of the developing roller corresponding to the opening portion and the other portion of the cartridge was increased, and as a result, image density unevenness was increased. Further, a surface potential of the portion of the developing roller positioned in the opening portion was low.

Further, it was shown that the image density difference could be decreased by setting the surface potential difference to less than 7.8 V.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-144362, filed Jul. 31, 2018, which is hereby incorporated by reference herein in its entirety.

The invention claimed is:

1. An electrophotographic member comprising:
   electroconductive substrate;
   an electroconductive elastic layer on or above the substrate, the elastic layer containing a urethane resin as a first resin; and
   an insulating portion on the elastic layer,
   the electrophotographic member having an outer surface comprising (i) an outer surface of the insulating portion and (ii) an outer surface of the elastic layer that is not covered with the insulating portion, wherein
   a region from the outer surface of the elastic layer constituting the outer surface of the electrophotographic member to a depth of 1 µm further comprises a second resin selected from the group consisting of a polyallyl resin, a vinyl resin, an acrylic resin and a methacrylic resin.

2. The electrophotographic member according to claim 1, wherein the elastic layer further contains the second resin in the region from the outer surface of the elastic layer covered with the insulating portion to a depth of 1 µm.

3. The electrophotographic member according to claim 1, wherein the second resin has a structural unit represented by Formula (1)

where R11 represents a hydrogen atom or methyl group,
X1 represents COOR12, CH$_2$OR13, OCOR14, or —R15,
R12 represents a hydrocarbon group having 1 to 18 carbon atoms or a structure represented by (R121-O)$_{n1}$-R122,
R121 represents a hydrocarbon group having 2 to 3 carbon atoms,
R122 represents a hydrocarbon group having 1 to 12 carbon atoms,
n1 represents an integer of 1 to 13,
R13 is selected from the group consisting of an alkyl group having 1 to 8 carbon atoms, an aryl group having 6 to 7 carbon atoms, and an acyl group having 1 to 6 carbon atoms,
R14 represents an alkyl group having 1 to 15 carbon atoms or an aryl group having 6 to 10 carbon atoms, and
R15 represents an aryl group having 6 to 14 carbon atoms.

4. The electrophotographic member according to claim 1, wherein the acrylic resin has a structure in which two or three partial structures represented by Formula (2) are linked to each other via a linking group R22, R22 being a divalent or trivalent group consisting of a carbon atom and a hydrogen atom, or a carbon atom, a hydrogen atom and an oxygen atom

where R21 represents a hydrogen atom or a methyl group, and * represents a binding moiety to a carbon atom in the linking group R22.

5. The electrophotographic member according to claim 4, wherein the linking group R22 is one member selected from the group consisting of a hydrocarbon group having 2 to 12 carbon atoms and Formulae (3) to (5)

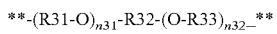

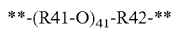

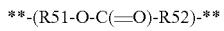

where R31 and R33 independently represent a hydrocarbon group having 2 to 3 carbon atoms, R32 represents a hydrocarbon group having 5 to 6 carbon atoms, R41 and R42 independently represent a hydrocarbon group having 2 to 4 carbon atoms, R51 represents a hydrocarbon group having 5 carbon atoms, R53 represents a hydrocarbon group having 4 carbon atoms, n31 and n32 independently represent an integer of 1 or 2, n41 represents an integer to 1 to 13, and ** represents a binding moiety to a moiety represented by * in Formula (2).

6. The electrophotographic member according to claim 4, wherein the linking group R22 is represented by Formula (6):

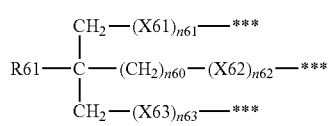

where R61 represents a hydrogen atom, a methyl group, or an ethyl group,
"*" * represents a binding moiety to a moiety represented by * in Formula (2),
X61 to X63 independently represent —OCH$_2$CH$_2$— or —OCH$_2$CH(CH$_3$)—,
n60 represents 0 or 1, and
n61 to n63 independently represent an integer of 0 or 1 or more, and n61+n62+n63 is an integer of 3 to 9.

7. The electrophotographic member according to claim 1, wherein the insulating portion contains a third resin comprising an acrylic resin.

8. The electrophotographic member according to claim 7, wherein the acrylic resin corresponding to the third resin has a structure in which a group having two to 18 valences, having a structure represented by Formula (7) are linked by a linking group R72, R72 being a group having two or more valences and 18 or less valences, and consisting of

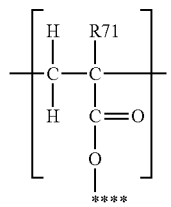

where R71 represents a hydrogen atom or a methyl group, and "**" ** represents a binding moiety to a carbon atom in the linking group R72.

9. The electrophotographic member according to claim 1, wherein the insulating portion contains a fourth resin represented by Formula (8)

where R81 represents a hydrogen atom or a methyl group, and X2 represents an atomic group having an aromatic structure.

10. The electrophotographic member according to claim 9, wherein X2 comprises an atomic group represented by Formula (9):

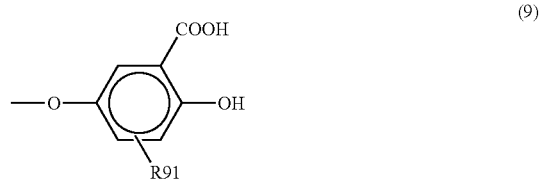

where R91 represents an alkyl group having 1 to 0.18 carbon atoms.

11. The electrophotographic member according to claim 1, wherein when a surface of the insulating portion constituting the outer surface of the electrophotographic member is charged to have a surface potential of V0 (V), a potential decay time constant defined as a time taken for a surface potential to decay to V0×(l/e) is 60.0 seconds or more.

12. The electrophotographic member according to claim 1, wherein when a surface of the elastic layer constituting the outer surface of the electrophotographic member is charged so as to have a surface potential of V0 (V), a potential decay time constant defined as a time taken for a surface potential to decay to V0×(l/e) is less than 6.0 seconds.

13. An electrophotographic process cartridge detachably attachable to an electrophotographic image forming apparatus, the electrophotographic process cartridge including a developing member comprising an electrophotographic member, wherein the electrophotographic member comprises:
an electroconductive substrate;
an electroconductive elastic layer on or above the substrate, the elastic layer containing a urethane resin as a first resin; and
an insulating portion on the elastic layer,
the electrophotographic member having an outer surface comprising (i) of an outer surface of the insulating portion and (ii) an outer surface of the elastic layer that is not covered with the insulating portion, wherein
the elastic layer has a region from the outer surface of the elastic layer constituting the outer surface of the electrophotographic member to a depth of 1 μm further comprises a second resin selected from the group consisting of a polyallyl resin, a vinyl resin, an acrylic resin and a methacrylic resin.

14. An electrophotographic image forming apparatus including:
an image carrier configured to carry an electrostatic latent image;
a charging device configured to primarily charge the image carrier;

an exposure device configured to form the electrostatic latent image on the primarily charged image carrier;

a developing device configured to develop the electrostatic latent image on a toner to form a toner image; and a transfer device configured to transfer the toner image to a transfer member, the developing device comprising an electrophotographic member comprising:

electroconductive substrate;

an electroconductive elastic layer on or above the substrate, the elastic layer containing a urethane resin as a first resin; and an insulating portion on the elastic layer, the electrophotographic member having outer surface comprising (i) an outer surface of the insulating portion and (ii) an outer surface of the elastic layer that is not covered with the insulating portion, wherein a region from the outer surface of the elastic layer constituting the outer surface of the electrophotographic member to a depth of 1 μm further comprises a second resin selected from the group consisting of a polyallyl resin, a vinyl resin, an acrylic resin and a methacrylic resin.

* * * * *